United States Patent
Steele, Jr. et al.

(10) Patent No.: US 6,603,742 B1
(45) Date of Patent: Aug. 5, 2003

(54) NETWORK RECONFIGURATION

(75) Inventors: Guy L. Steele, Jr., Lexington, MA (US); Steven K. Heller, Chelmsford, MA (US); Daniel Cassiday, Topsfield, MA (US); Jon Wade, Wellesley, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/323,962

(22) Filed: Jun. 2, 1999

(51) Int. Cl.⁷ .............................................. H04L 12/28
(52) U.S. Cl. ...................................... 370/254; 370/400
(58) Field of Search ................................. 370/351, 242, 370/408, 402, 400, 254; 709/238, 293, 242, 246, 258

(56) References Cited

U.S. PATENT DOCUMENTS

| | | |
|---|---|---|
| 5,128,932 A | 7/1992 | Li |
| 5,453,978 A | 9/1995 | Sethu et al. |
| 5,602,839 A | 2/1997 | Annapareddy et al. |
| 5,680,116 A | 10/1997 | Hashimoto et al. |
| 5,721,819 A | 2/1998 | Galles et al. |
| 5,740,346 A | 4/1998 | Wicki et al. |
| 5,751,710 A * | 5/1998 | Crowther et al. ............ 370/423 |
| 5,751,967 A | 5/1998 | Raab et al. |
| 5,768,501 A | 6/1998 | Lewis |
| 5,781,546 A | 7/1998 | Sethu |
| 5,812,549 A | 9/1998 | Sethu |
| 5,859,981 A | 1/1999 | Levin et al. |
| 5,874,964 A | 2/1999 | Gille |
| 5,884,047 A | 3/1999 | Aikawa et al. |
| 5,914,953 A | 6/1999 | Krause et al. |
| 5,970,232 A * | 10/1999 | Passint et al. .......... 395/200.68 |
| 6,005,860 A | 12/1999 | Anderson et al. |
| 6,031,835 A | 2/2000 | Abali et al. |
| 6,055,618 A | 4/2000 | Thorson |
| 6,064,671 A | 5/2000 | Killian |
| 6,097,718 A | 8/2000 | Bion |
| 6,137,781 A | 10/2000 | Goto et al. |
| 6,230,252 B1 | 5/2001 | Passint et al. |
| 6,243,760 B1 | 6/2001 | Armbruster et al. |
| 6,256,295 B1 | 7/2001 | Callon |
| 6,295,573 B1 | 9/2001 | Bailey et al. |
| 6,437,804 B1 | 8/2002 | Ibe et al. |

FOREIGN PATENT DOCUMENTS

EP           817097 A2     1/1998

OTHER PUBLICATIONS

Whay C. Lee, "Topology Aggregation for Hierarchical Routing in ATM Networks." Apr. 1, 1995, pp. 82–92, Computer–Communication Review.

(List continued on next page.)

*Primary Examiner*—Wellington Chin
*Assistant Examiner*—Brenda Pham
(74) *Attorney, Agent, or Firm*—Finnegan, Henderson, Farabow, Garrett & Dunner, L.L.P.

(57) ABSTRACT

In accordance with methods and systems consistent with the present invention, an improved technique for reconfiguring networks is provided. By using this technique, a network administrator can reconfigure their network while it remains operational. As a result, users can continue to utilize the network during reconfiguration. Additionally, in accordance with methods and systems consistent with the present invention, a number of network topologies are provided that are designed to facilitate reconfiguration. When using one of these topologies, the network can be reconfigured with a minimal amount of recabling, thus reducing the amount of time required for reconfiguration.

86 Claims, 15 Drawing Sheets

OTHER PUBLICATIONS

IBM, "Clustering Algorithm for Computer Network Management Graphics", Jun. 1988, pp. 71–79, IBM Technical Disclosure Bulletin, vol. 31, No. 1.

Peercy, M. et al., "Distributed Algorithms for Shortest–Path, Deadlock–Free Routing and Broadcasting in Arbitrarily Faulty Hypercubes," International Symposium on Fault Tolerant Computing Systems (FTCS), US, Los Alamitos, IEEE Comp. Soc. Press, vol. Symp. 20, Jun, 26, 1990, pp. 218–225.

Fleury, E. et al., "A General Theory for Deadlock Avoidance in Wormhole–Routed Networks," IEEE Trans. on Parallel and Distributed Systems, IEEE Inc., NY, vol. 9, No. 7, Jul. 1, 1998, pp. 626–638.

Pifarre G. D. et al., "Adaptive Deadlock–and Livestock–Free Routing in the Hypercube Network," IEEE Trans. on Parallel and Distributed Systems, IEEE Inc., NY, vol. 5, No. 11, Nov. 1, 1994, pp. 1121–1138.

* cited by examiner

NETWORK RECONFIGURATION

RELATED APPLICATIONS

The following identified U.S. patent applications are relied upon and are incorporated by reference in this application.

U.S. patent application Ser. No. 09/323,963, entitled "Improved Network Topologies," filed on even date herewith, assigned to a common assignee.

U.S. patent application Ser. No. 09/323,696, entitled "Deadlock-Free Routing," filed on even date herewith, assigned to a common assignee.

U.S. patent application Ser. No. 09/323,91, entitled "Dynamic Generation of Deadlock-Free Routings," filed on even date herewith, assigned to a common assignee.

U.S. patent application Ser. No. 09/323,965, entitled "Recursive Partitioning of Networks," filed on even date herewith, assigned to a common assignee.

FIELD OF THE INVENTION

The present invention relates generally to data processing systems and, more particularly, to network reconfiguration.

BACKGROUND OF THE INVENTION

"configuring a network" refers to changing the topology of the network (e.g., adding a node or removing a node). A "network topology" refers to the structure that provides the communications interconnection among nodes of a network. As used herein, the term "node" refers to any device capable of communicating, such as a computer, router, switch, network processor, or symmetric multiprocessor. Thus, the topology of a network refers to the network's particular configuration of links and nodes.

In conventional static-routing networks, reconfiguring a network requires four steps as shown in FIG. 1. A static-routing network uses statically-defined routing tables to perform routing. The routing is considered to be static because if the network is reconfigured, all of the routing tables need to be manually updated to account for the reconfiguration. For example, if the reconfiguration involves removing a node, the routing tables need to be updated to avoid routing through this node. And if the reconfiguration involves adding a node, the routing tables need to be updated to route to the new node.

When reconfiguring a static-routing network, the network administrator first terminates all processes communicating via the network (step 102). Next, the system administrator reconfigures the network by adding or removing a node and by performing the appropriate recabling (step 104). Then, the network administrator updates the routing tables in the network to account for the reconfiguration (e.g., avoid the removed node) (step 106) and, finally, restarts the processes that were terminated (step 108). By reconfiguring networks in this manner, the networks are rendered nonoperational for a significant amount of time, such as a few hours. It is thus desirable to improve how networks are reconfigured.

SUMMARY OF THE INVENTION

In accordance with methods and systems consistent with the present invention, an improved technique for reconfiguring networks is provided. By using this technique, a network administrator can reconfigure their network while it remains operational. As a result, users can continue to utilize the network during reconfiguration. Additionally, in accordance with methods and systems consistent with the present invention, a number of network topologies are provided that are designed to facilitate reconfiguration. When using one of these topologies, the network can be reconfigured with a minimal amount of recabling, thus reducing the amount of time required for reconfiguration.

In accordance with methods consistent with the present invention, a method is provided in a distributed system containing a network with nodes, where each of the nodes has ports. This method configures the network to maximize port usage, renders the network operational such that the nodes are capable of communicating via the network using static routing, and reconfigures the network while the network remains operational.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

In accordance with methods and systems consistent with the present invention, an improved technique for reconfiguring a network is provided that allows the network to continue operating during reconfiguration. Also, various upgrade/downgrade sequences are provided for adding and removing one or more nodes which require only a minimal amount of recabling. Thus, by reconfiguring a network in accordance with methods and systems consistent with the present invention, the network remains operational and a minimum amount of recabling is required.

The upgrade/downgrade sequences occur in a family of network topologies which have been selected to facilitate reconfiguration. These network topologies are discussed below, and they are also discussed in further detail in copending U.S. patent application Ser. No. 09/323,963, entitled "Improved Network Topologies," which has previously been incorporated by reference. In addition to the network topologies, described below are exemplary routing tables for use in the network topologies as well as exemplary routing tables for use during network reconfiguration. All of these routing tables provide routings that are deadlock free. Thus, using these routing tables ensures that a deadlock does not occur in the network. The term "deadlock" refers to an undesirable system state that occurs when a cycle of multi-hop packets are each waiting on a busy node on the next hop. A "multi-hop" packet refers to a packet that is routed through at least one node before reaching its destination. A deadlock may occur, for example, in a network of three nodes (node 1, node 2, and node 3), where node 1 is waiting to send a multi-hop packet to node 2 (which is not the packet's destination), where node 2 is waiting to send a multi-hop packet to node 3 (which is not the packet's destination), and where node 3 is waiting to send a multi-hop packet to node 1 (which is not the packet's destination). Since each node is waiting on the other, a stalemate or deadlock occurs, and these nodes are rendered non-operational. Deadlock-free routing is described in greater detail in copending U.S. patent application Ser. No. 09/325, 696 entitled "Deadlock-free Routing," which has previously been incorporated by reference.

Implementation Details

Figure 1:
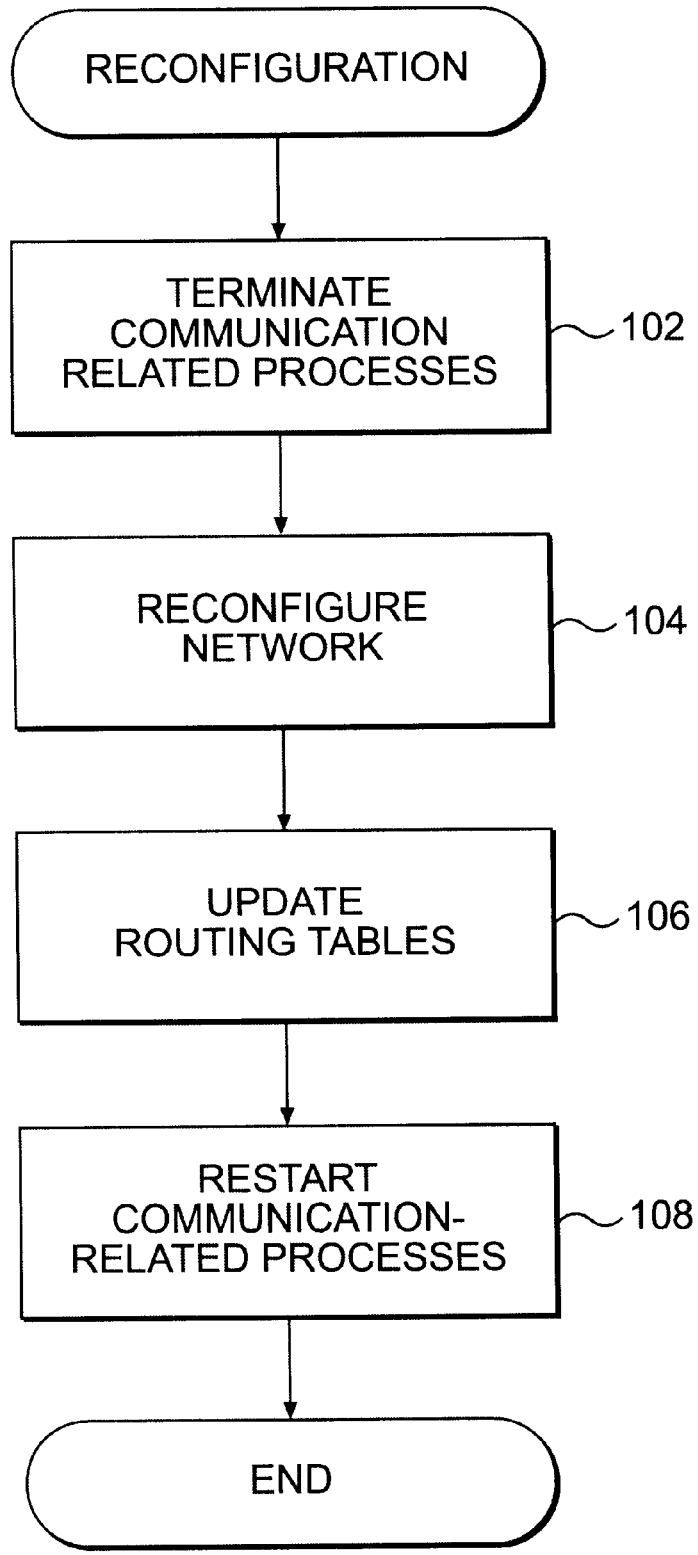
FIG. 1 depicts a flowchart of the steps performed by a conventional system during network reconfiguration.
Figure 2:
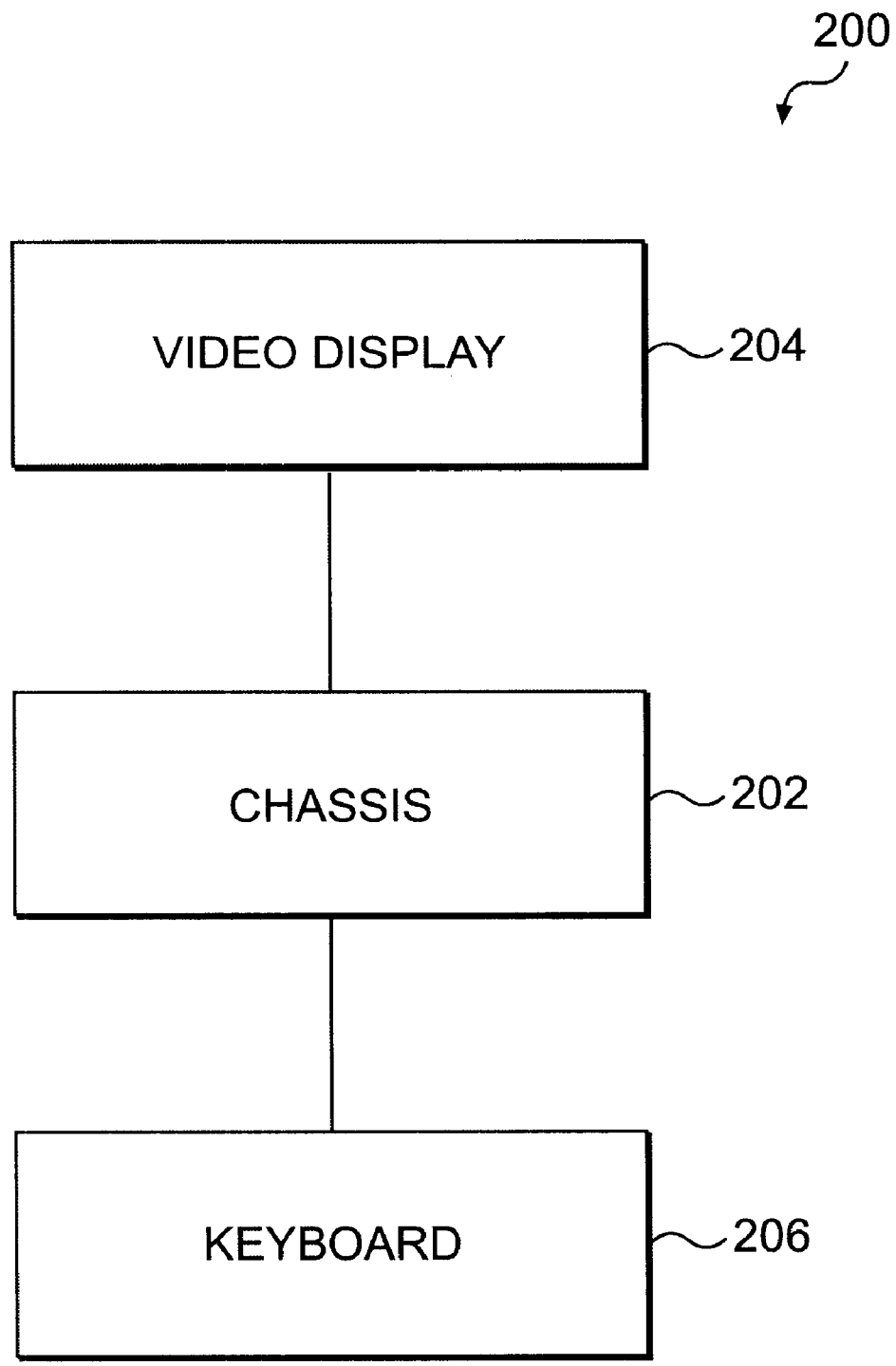
FIG. 2 depicts a data processing system suitable for use with methods and systems consistent with the present invention.

FIG. 2 depicts a data processing system 200 suitable for use with methods and systems consistent with the present invention. Data processing system 200 contains a chassis 202 connected to a video display 204 and a keyboard 206. Data processing system 200 is suitable for use as one or more nodes in the network topologies described below.

Figure 3:
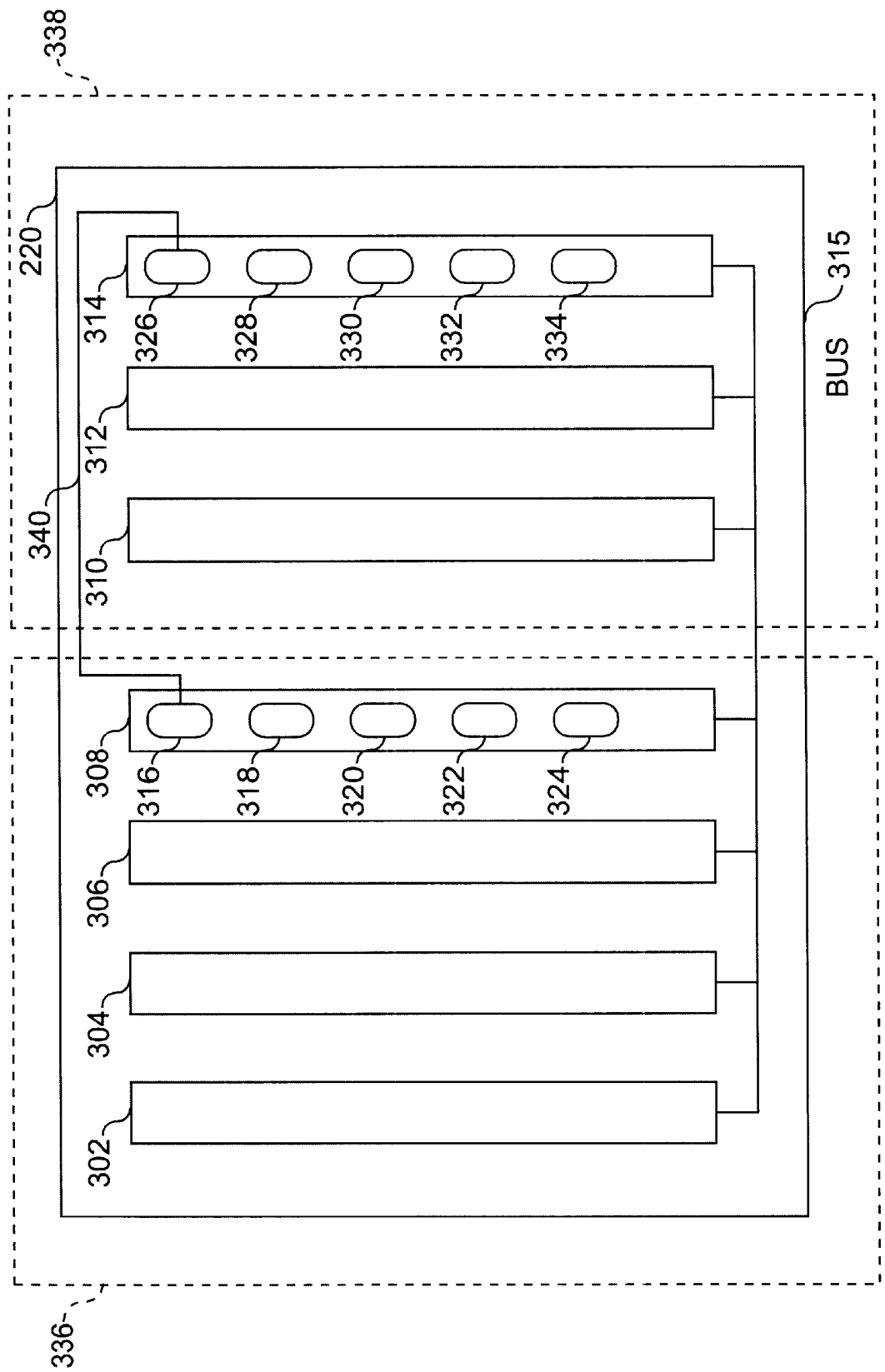
FIG. 3 depicts a more detailed diagram of the chassis of FIG. 2.

As shown in FIG. 3, chassis 202 contains up to seven cards 302–314 interconnected via bus 315. Of these cards, cards 308 and 314, known as routing cards, perform routing functionality with each having five ports 316–324 and 326–334 that connect to a communication link (e.g., a cable). The cards other than the routing cards (i.e., cards 302–306, 310, and 312) typically contain multiple CPUs, memory, and secondary storage. In accordance with methods and systems consistent with the present invention, cards 302–308 form a single node 336. Likewise, cards 310–314 form a single node 338. Nodes 336 and 338 are referred to as partner nodes because they are both located in the same chassis 202. Since node 336 and node 338 are separate communications nodes, they may be interconnected via a communications link 340, known as a partner link. A partner link is used to transfer control information between two partner nodes: the actual data is transferred via the bus 315 for faster communications. One skilled in the art will appreciate that data processing system 200 and chassis 202 may include additional or different components, including additional nodes.

Figure 4:
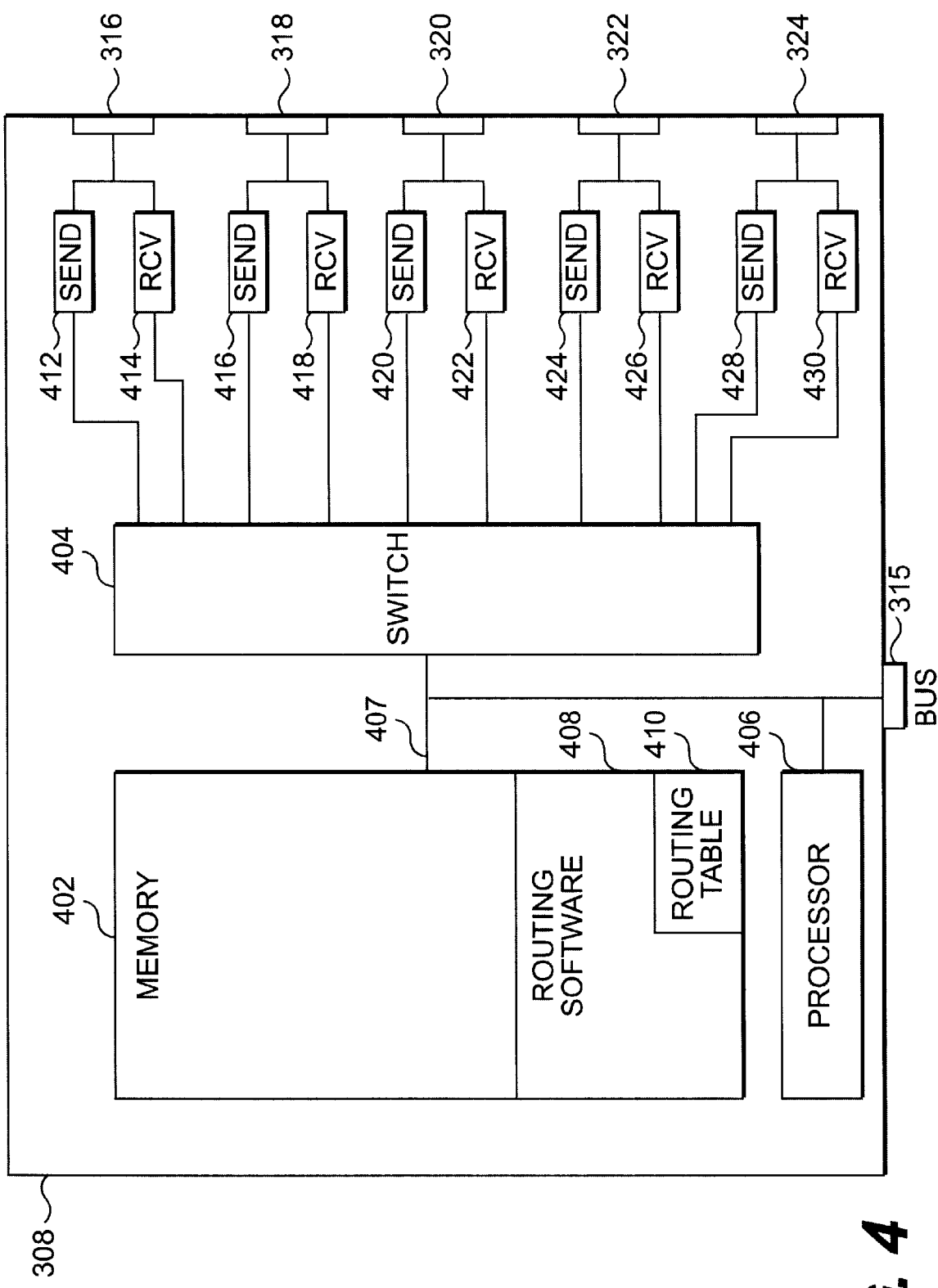
FIG. 4 depicts a more detailed diagram of a routing card depicted in FIG. 3.

FIG. 4 depicts a more detailed diagram of routing card 308, although routing card 314 is similarly configured. Routing card 308 contains a memory 402, a switch 404, and a processor 406 interconnected by an internal bus 407, which also connects to bus 315. Memory 402 contains routing software 408 that routes traffic through the network using routing table 410. The switch coordinates the sending and receiving of information across the network via ports 316–324 by using a send and receive buffer 412–430 for each port.

Although aspects of the present invention are described as being stored in memory, one skilled in the art will appreciate that these aspects can also be stored on or read from other types of computer-readable media, such as secondary storage devices, like hard disks, floppy disks, or CD-ROM; a carrier wave from a network, such as the Internet; or other forms of RAM or ROM either currently known or later developed. Sun, Sun Microsystems, the Sun logo, Java™, and Java™-based trademarks are trademarks or registered trademarks of Sun Microsystems, Inc. in the United States and other countries.

Network Topologies

In accordance with methods and systems consistent with the present invention, a number of network topologies are provided where the topologies have been selected based on both performance characteristics and the ease with which the network can be reconfigured. Network topologies for networks having seven to sixteen nodes are presented below with exemplary routing tables. The topologies for networks having less than seven nodes are not presented because they are fully connected. That is, since each routing card has five ports, in networks of six or less nodes, each node can be connected to each other node. In such a situation, the network is referred to as being fully connected.

Figure 5:
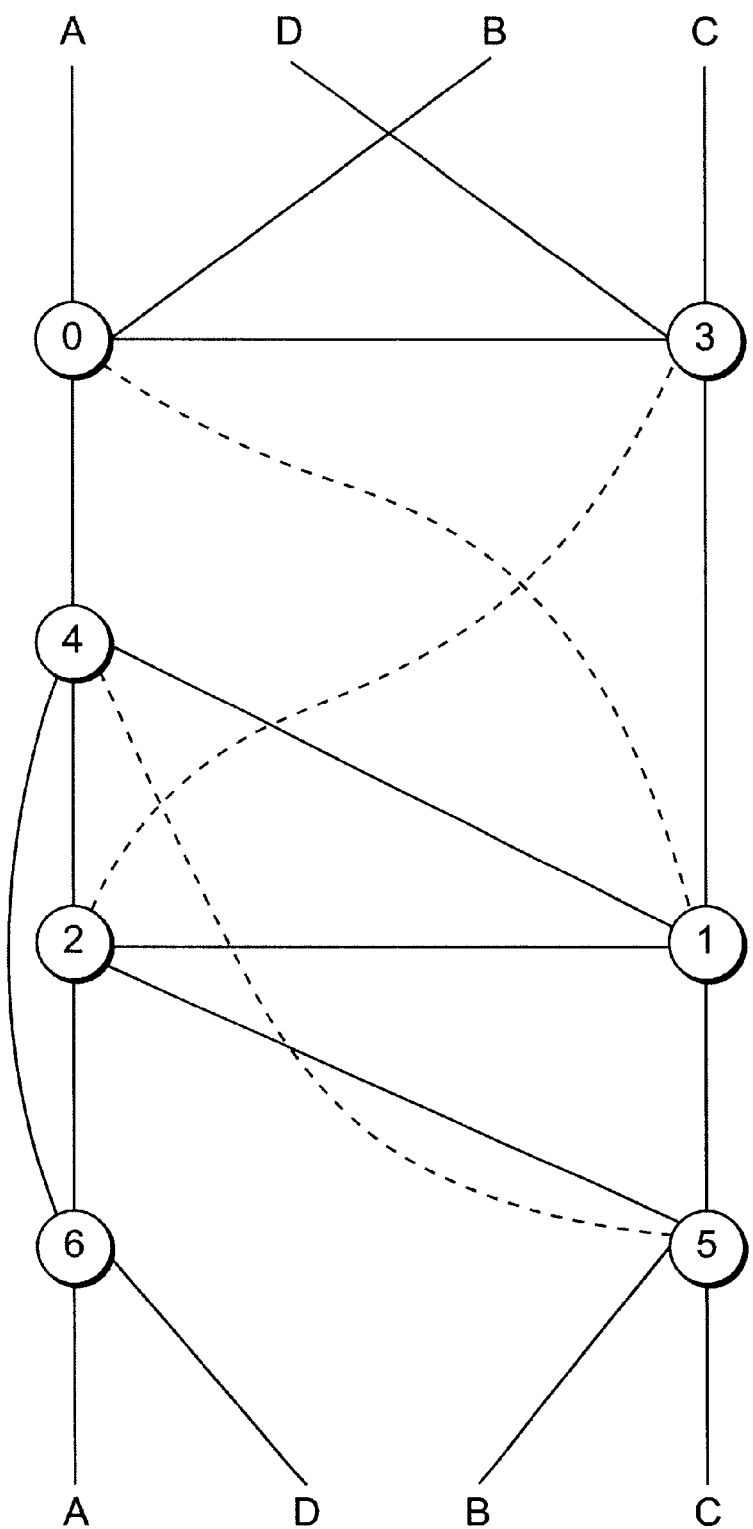
FIG. 5 depicts a network topology for a network of 7 nodes in accordance with methods and systems consistent with the present invention.

FIG. 5 depicts a network topology for a network of seven nodes in accordance with methods and systems consistent with the present invention. Each node, node 0 through node 6, has up to five links to other nodes. Each link is depicted as either a solid line or a dashed line. A solid line indicates that the link is a nonpartner link; a dashed line indicates that the link is a partner link between partner nodes. Accordingly, the two partner nodes are contained in the same device. In FIG. 5, the letters (e.g., "A") indicate a continuing connection to another like-lettered node. For example, node 0 is connected to node 6.

As shown in FIG. 5, node 0 has a partner link with node 1 and directly connects to nodes 3, 4, 5, and 6. Node 1 has a partner link with node 0 and directly connects to nodes 2, 3, 4, and 5. Node 2 has a partner link with node 3 and directly connects to nodes 1, 4, 5, and 6. Node 3 has a partner link with node 2 and directly connects to nodes 0, 1, 5, and 6. Node 4 has a partner link with node 5 and directly connects to nodes 0, 1, 2, and 6. Node 5 has a partner link with node 4 and directly connects to nodes 0, 1, 2, and 3, and node 6 directly connects to nodes 0, 2, 3, and 4. Below is a sample routing table for this network. The first row of this table, for example, shows that data from node 0 may be sent directly to nodes 1, 3, 4, 5, and 6 and that data from node 0 may be sent to node 2 via node 3.

| FROM\TO | 0 | 1 | 2 | 3 | 4 | 5 | 6 |
|---|---|---|---|---|---|---|---|
| 0 |   | — | 3 | — | — | — | — |
| 1 | — |   | — | — | — | — | 4 |
| 2 | 1 | — |   | — | — | — | — |
| 3 | — | — | — |   | 5 | — | — |
| 4 | — | — | 2 | — |   | — | — |
| 5 | — | — | — | — | — |   | 3 |
| 6 | — | 0 | — | — | — | 4 |   |

Figure 6:
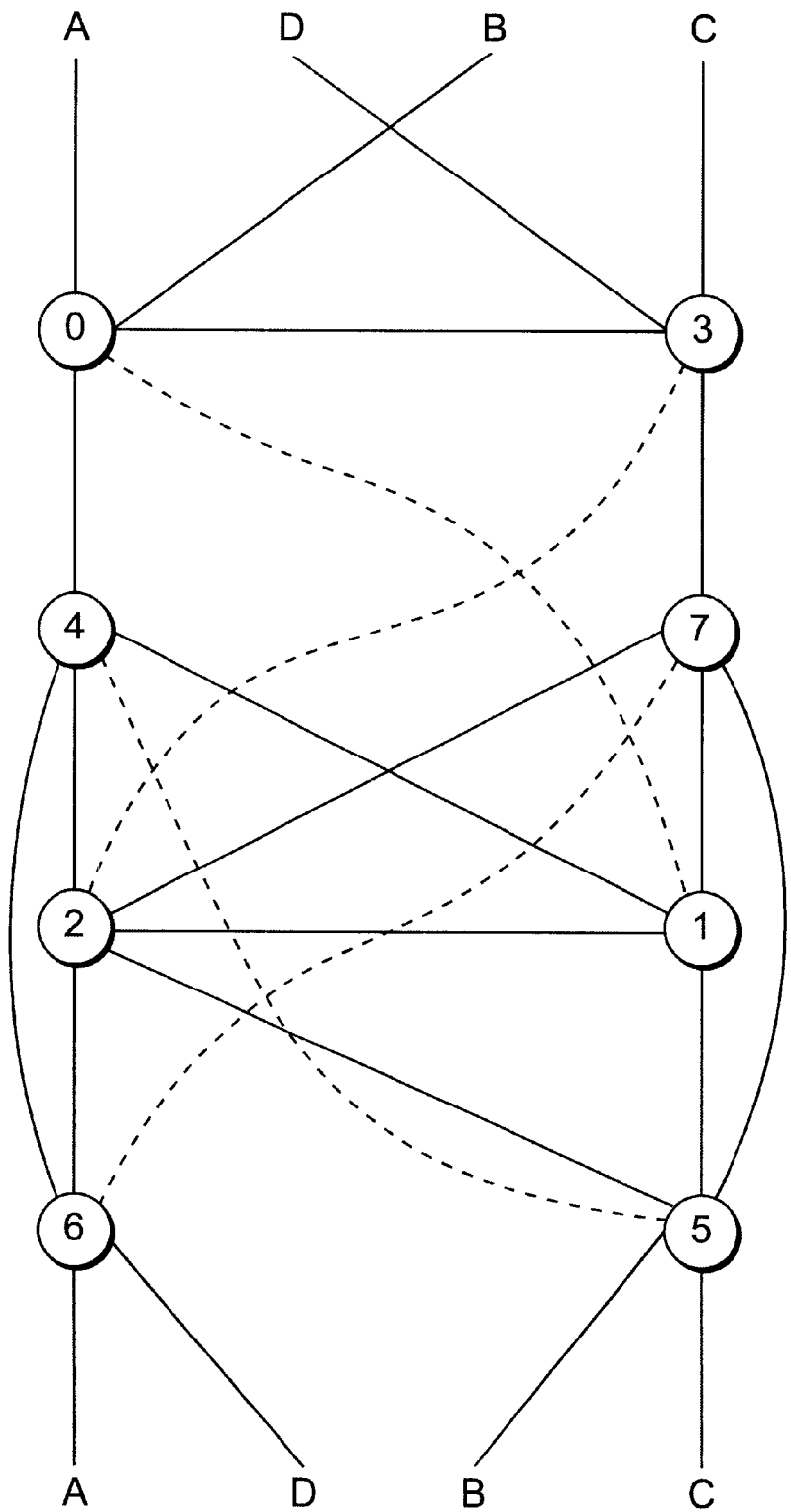
FIG. 6 depicts a network topology for a network of 8 nodes in accordance with methods and systems consistent with the present invention.

FIG. 6 depicts a network topology for a network of 8 nodes in accordance with methods and systems consistent with the present invention. As shown in FIG. 6, node 0 has a partner link with node 1 and directly connects to nodes 3 through 6. Node 1 has a partner link with node 0 and directly connects to nodes 2, 4, 5, and 7. Node 2 has a partner link with node 3 and directly connects to nodes 1, 4, 6, and 7. Node 3 has a partner link with node 2 and directly connects to node 0 and nodes 5 through 7. Node 4 has a partner link with node 5 and directly connects to nodes 0–2 and 6.

Node 5 has a partner link with node 4 and directly connects to nodes 0, 1, 3, and 7. Node 6 has a partner link with node 7 and directly connects to nodes 0 and 2–4, and node 7 has a partner link with node 6 and directly connects to nodes 1–3 and 5. Below is an exemplary routing table for this network.

| FROM\TO | 0 | 1 | 2 | 3 | 4 | 5 | 6 | 7 |
|---|---|---|---|---|---|---|---|---|
| 0 |   | — | 3 | — | — | — | — | 6 |
| 1 | — |   | — | 2 | — | — | 7 | — |
| 2 | 1 | — |   | — | — | 4 | — | — |
| 3 | — | 0 | — |   | 5 | — | — | — |
| 4 | — | — | 2 | — |   | — | — | 6 |
| 5 | — | — | 3 | — | — |   | 7 | — |
| 6 | — | 0 | — | — | 4 | — |   | — |
| 7 | 1 | — | — | — | 5 | — | — |   |

Figure 7:
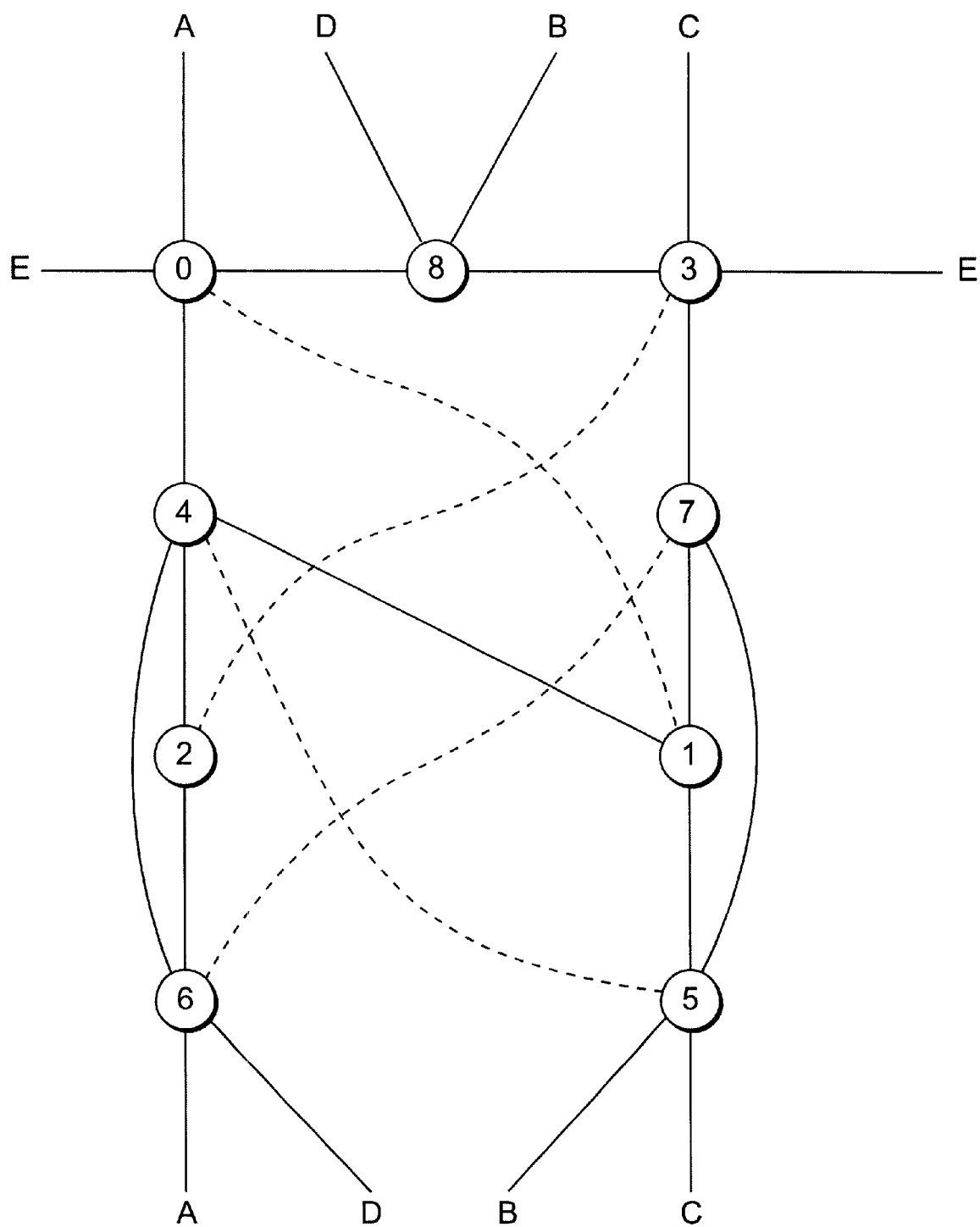
FIG. 7 depicts a network topology for a network of 9 nodes in accordance with methods and systems consistent with the present invention.

FIG. 7 depicts a network topology for a network of 9 nodes in accordance with methods and systems consistent with the present invention. As shown in FIG. 7, node 0 has a partner link with node 1 and directly connects to nodes 3, 4, 6, and 8. Node 1 has a partner link with node 0 and directly connects to nodes 2, 4, 5, and 7. Node 2 has a partner link with node 3 and directly connects to nodes 1, 4, 6, and 7. Node 3 has a partner link with node 2 and directly connects to nodes 0, 5, 7 and 8. Node 4 has a partner link with node 5 and directly connects to nodes 0–2 and 6. Node has a partner link with node 4 and directly connects to nodes 1, 3, 7, and 8. Node 6 has a partner link with node 7 and directly connects to nodes 0, 2,4, and 8. Node 7 has a partner link with node 6 and directly connects to nodes 1–3 and 5, and node 8 directly connects to nodes 0, 3, 5, and 6. Below is an exemplary routing table.

| FROM\TO | 0 | 1 | 2 | 3 | 4 | 5 | 6 | 7 | 8 |
|---|---|---|---|---|---|---|---|---|---|
| 0 |   | — | 3 | — | — | 4 | — | 6 | — |
| 1 | — |   | — | 2 | — | — | 7 | — | 5 |
| 2 | 1 | — |   | — | — | 4 | — | — | 6 |
| 3 | — | 0 | — |   | 5 | — | 7 | — | — |
| 4 | — | — | 2 | — |   | — | — | 6 | 0 |
| 5 | 1 | — | 3 | — | — |   | 7 | — | — |
| 6 | — | 0 | — | 2 | — | 4 |   | — | — |
| 7 | 1 | — | — | — | 5 | — | — |   | 3 |
| 8 | — | 0 | 3 | — | 5 | — | — | 6 |   |

Figure 8:
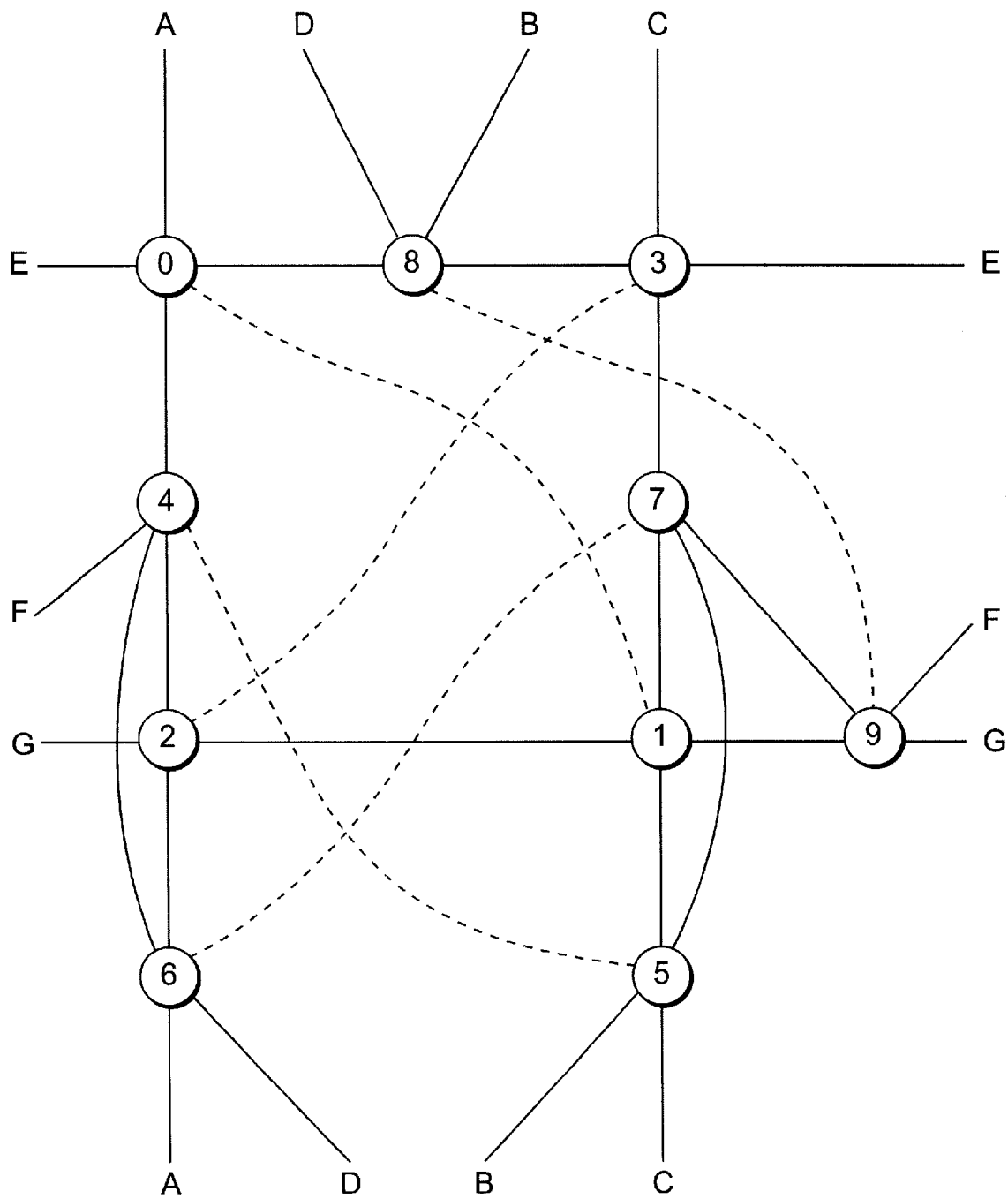
FIG. 8 depicts a network topology for a network of 10 nodes in accordance with methods and systems consistent with the present invention.

FIG. 8 depicts a network topology for a network of 10 nodes in accordance with methods and systems consistent with the present invention. As shown in FIG. 8, node 0 has a partner link with nodes 1 and directly connects to nodes 3, 4, 6, and 8. Node 1 has a partner link with node 0 and directly connects to nodes 2, 5, 7, and 9. Node 2 has a partner link with node 3 and directly connects to nodes 1, 4, 6, and 9. Node 3 has a partner link with node 2 and directly connects to nodes 0, 5, 7, and 8. Node 4 has a partner link with node 5 and directly connects to nodes 0,2, 6, and 9. Node 5 has a partner link with node 4 and directly connects to nodes 1, 3, 7, and 8. Node 6 has a partner link with node 7 and directly connects to nodes 0, 2, 4, and 8. Node 7 has a partner link with node 6 and directly connects to nodes 1, 3, 5, and 9. Node 8 has a partner link with node 9 and directly connects to node 0, 3, 5, and 6 node 9 has a partner link with node 8 and directly connects to nodes 1, 2, 4, and 7. Below is an exemplary routing table for this network.

| FROM\TO | 0 | 1 | 2 | 3 | 4 | 5 | 6 | 7 | 8 | 9 |
|---|---|---|---|---|---|---|---|---|---|---|
| 0 |   | — | 3 | — | — | 4 | — | 6 | — | 8 |
| 1 | — |   | — | 2 | 5 | — | 7 | — | 9 | — |
| 2 | 1 | — |   | — | — | 4 | — | 6 | 9 | — |
| 3 | — | 0 | — |   | 5 | — | 7 | — | — | 8 |
| 4 | — | 0 | — | 2 |   | — | — | 6 | 9 | — |
| 5 | 1 | — | 3 | — | — |   | 7 | — | — | 8 |
| 6 | — | 0 | — | 2 | — | 4 |   | — | — | 8 |
| 7 | 1 | — | 3 | — | 5 | — | — |   | 9 | — |
| 8 | — | 0 | 3 | — | 5 | — | — | 6 |   | — |
| 9 | 1 | — | — | 2 | — | 4 | 7 | — | — |   |

Figure 9:
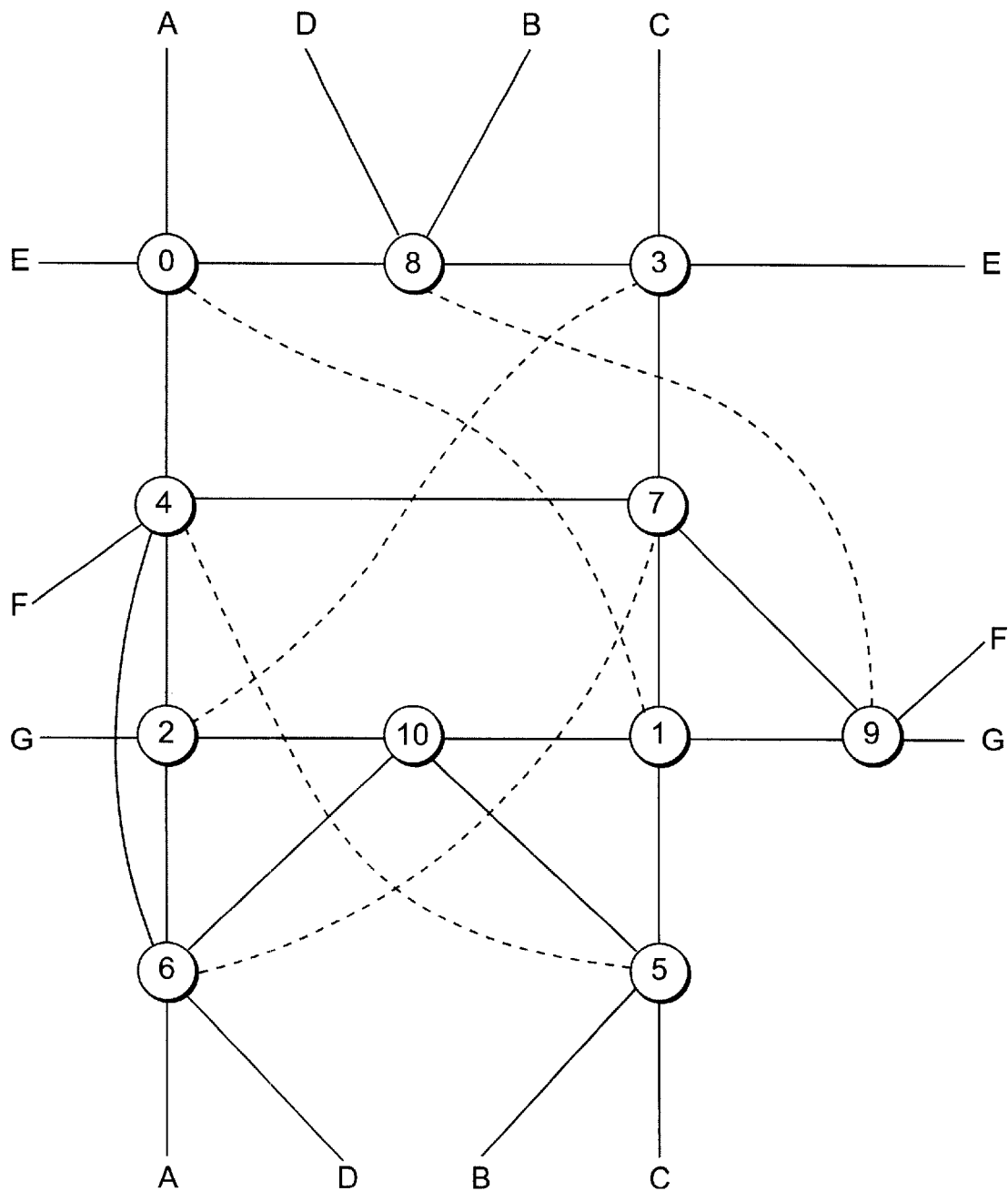
FIG. 9 depicts a network topology for a network of 11 nodes in accordance with methods and systems consistent with the present invention.

FIG. 9 depicts a network topology for a network of 11 nodes in accordance with methods and systems consistent with the present invention. As shown in FIG. 9, node 0 has a partner link with node 1 and directly connects to nodes 3, 4, 6, and 8. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 0, 5, 7, and 8. Node 4 has a partner link with node 5 and directly connects to nodes 0, 2, 7, and 9. Node 5 has a partner link with node 4 and directly connects to nodes 1, 3, 8, and 10. Node 6 has a partner link with node 7 and directly connects to nodes 0, 2, 8, and 10. Node 7 has a partner link with node 6 and directly connects to nodes 1, 3, 4, and 9. Node 8 has a partner link with node 9 and directly connects to nodes 0, 3, 5, and 6. Node 9 has a partner link with node 8 and directly connects to nodes 1, 2, 4, and 7, and node 10 directly connects to nodes 1, 2, 5, and 6. A sample routing table for this network is provided below.

| FROM\TO | 0 | 1 | 2 | 3 | 4 | 5 | 6 | 7 | 8 | 9 | 10 |
|---|---|---|---|---|---|---|---|---|---|---|---|
| 0 |   | — | 3 | — | — | 4 | — | 6 | — | 8 | 6 |
| 1 | — |   | 9 | 5 | 5 | — | 7 | — | 9 | — | — |

-continued

| FROM\TO | 0 | 1 | 2 | 3 | 4 | 5 | 6 | 7 | 8 | 9 | 10 |
|---|---|---|---|---|---|---|---|---|---|---|---|
| 2 | 6 | 10 | — | — | 4 | — | 6 | 9 | — | — | — |
| 3 | — | 0 | — | | 5 | — | 7 | — | — | 8 | 5 |
| 4 | — | 0 | — | 2 | | — | 7 | — | 9 | — | 2 |
| 5 | 1 | — | 3 | — | — | | 8 | 1 | — | 8 | — |
| 6 | — | 0 | — | 2 | 2 | 8 | | — | — | 8 | — |
| 7 | 1 | — | 3 | — | — | 4 | — | | — | 9 | — | 1 |
| 8 | — | 0 | 3 | — | 5 | — | — | 6 | | — | 6 |
| 9 | 1 | — | — | 2 | — | 4 | 7 | — | — | | 1 |
| 10 | 1 | — | — | 2 | 5 | — | — | 6 | 6 | 2 | |

Figure 10:
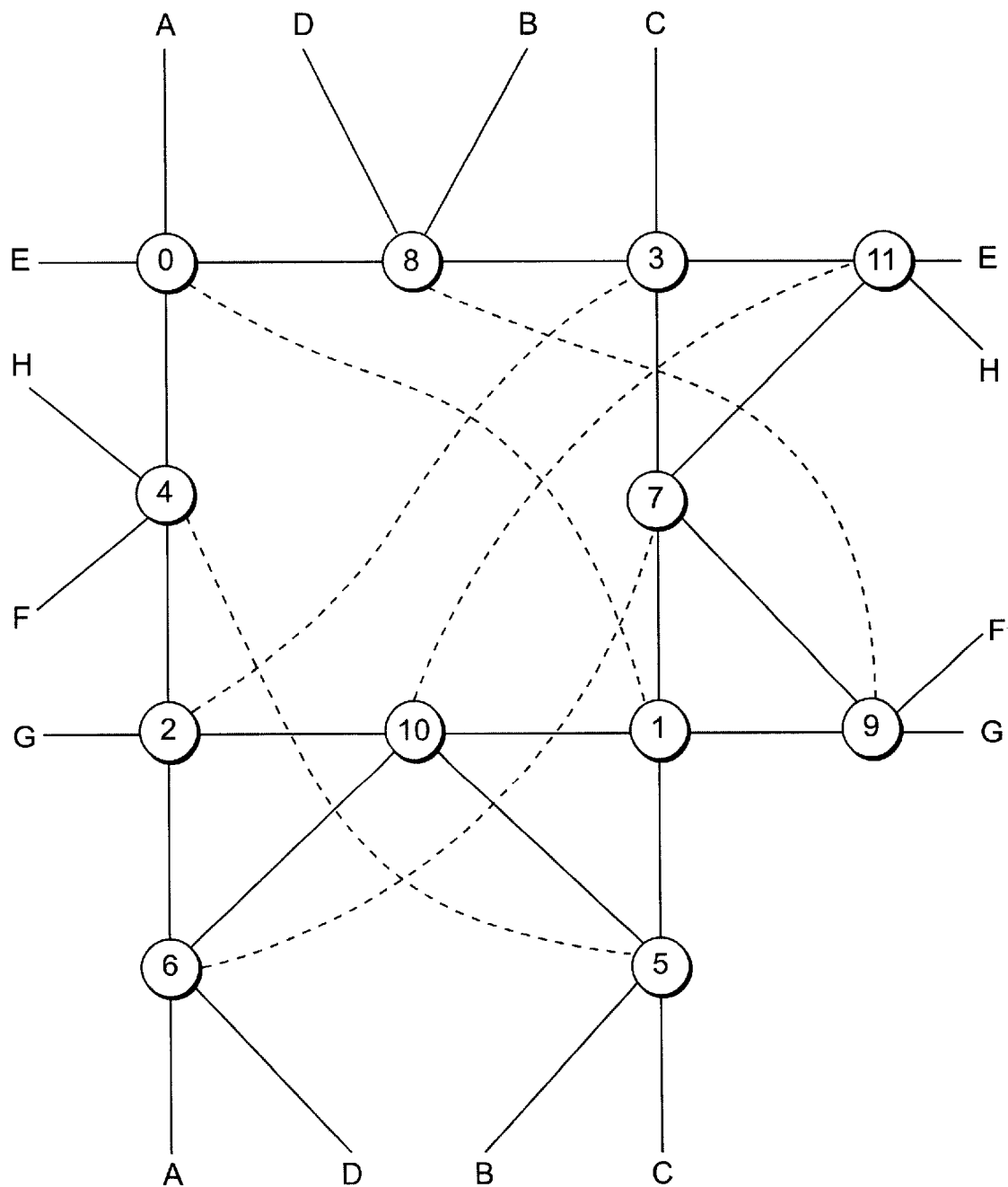
FIG. 10 depicts a network topology for a network of 12 nodes in accordance with methods and systems consistent with the present invention.

FIG. 10 depicts a network topology for a network of 12 nodes in accordance with methods and systems consistent with the present invention. As shown in FIG. 10, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 11. Node 5 has a partner link with node 4 and directly connects to nodes 1, 3, 8, and 10. Node 6 has a partner link with node 7 and directly connects to nodes 0, 2, 8, and 10. Node 7 has a partner link with node 6 directly connects to nodes 1, 3, 9, and 11. Node 8 has a partner link with node 9 and directly connects to nodes 0, 3, 5, and 6. Node 9 has a partner link with node 8 and directly connects to nodes 1, 2, 3, and 7. Node 10 has a partner link with node 11 and directly connects to nodes 1, 2, 5, and 6, and node 11 has a partner link with node 10 and directly connects to nodes 0, 3, 4, and 7. An exemplary routing table is provided below.

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 | | — | 4 | 8 | — | 4 | — | 6 | — | 8 | 11 | — |
| 1 | — | | 9 | 5 | 5 | — | 7 | — | 9 | — | — | 10 |
| 2 | 6 | 10 | | — | — | 4 | — | 6 | 9 | — | — | 10 |
| 3 | 11 | 7 | — | | 5 | — | 7 | — | — | 8 | 11 | — |
| 4 | — | 0 | — | 2 | | — | 0 | 9 | 9 | — | 11 | — |
| 5 | 1 | — | 3 | — | — | | 10 | 1 | — | 8 | — | 10 |
| 6 | — | 0 | — | 2 | 2 | 10 | | — | — | — | 8 | — | 10 |
| 7 | 1 | — | 3 | — | 9 | 3 | — | | — | 9 | — | 11 | — |
| 8 | — | 0 | 3 | — | 5 | — | — | 6 | | — | 5 | 0 |
| 9 | 1 | — | — | 2 | — | 4 | 7 | — | — | | 1 | 7 |
| 10 | 1 | — | — | 2 | 5 | — | — | 6 | 5 | 2 | | — |
| 11 | — | 0 | 3 | — | — | 4 | 7 | — | 3 | 7 | — | |

Figure 11:
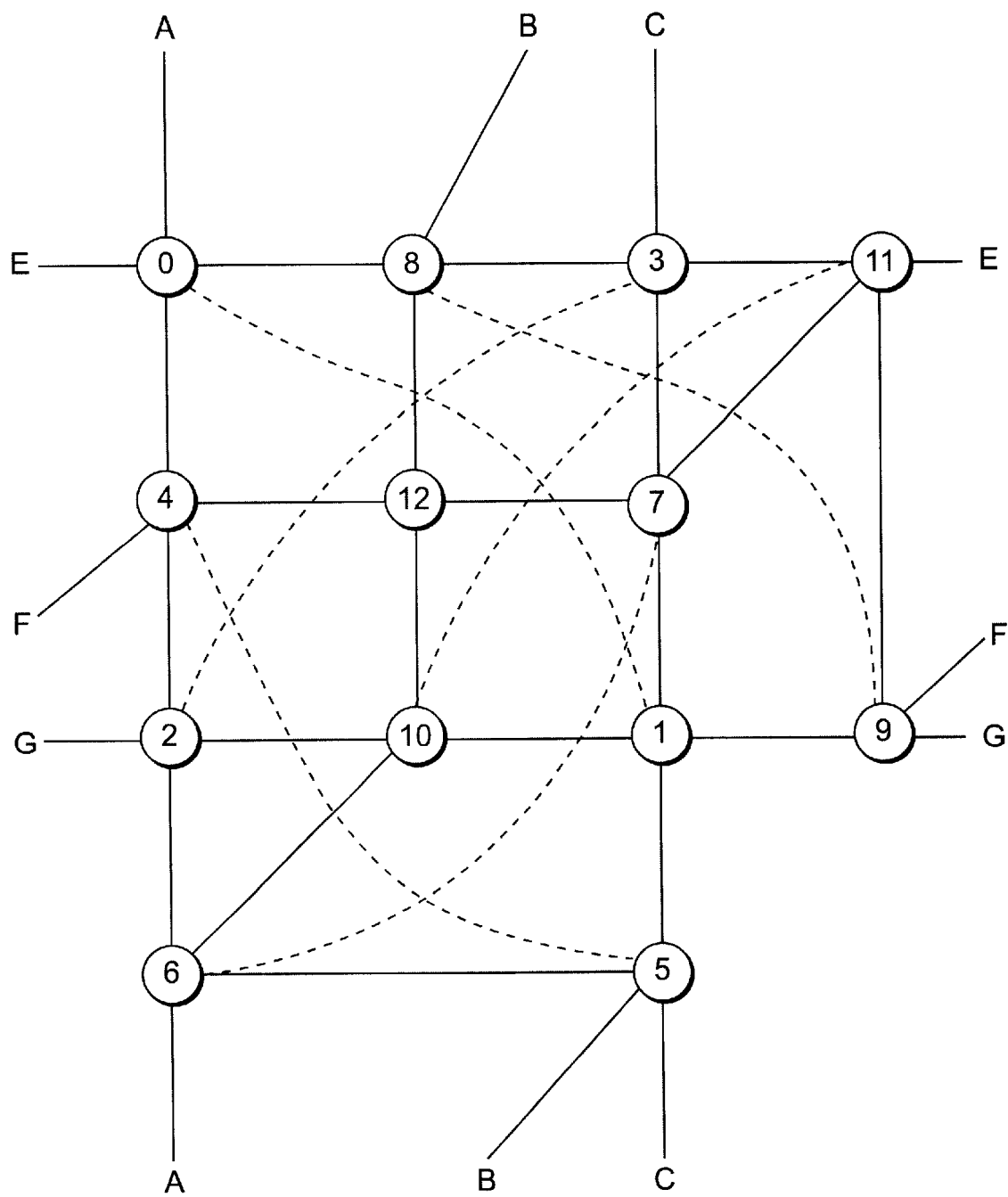
FIG. 11 depicts a network topology for a network of 13 nodes in accordance with methods and systems consistent with the present invention.

FIG. 11 depicts a network topology for a network of 13 nodes in accordance with methods and systems consistent with the present invention. As shown in FIG. 11, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 6, and 8. Node 6 has a partner link with node 7 and directly connects to nodes 0, 2, 5, and 10. Node 7 has a partner link with node 6 and directly connects to nodes 1, 3, 11, and 12. Node 8 has a partner link with node 9 and directly connects to nodes 0, 3, 5, and 12. Node 9 has a partner link with node 8 and directly connects to nodes 1, 2, 4, and 11. Node 10 has a partner link with node 11 and directly connects to nodes 1, 2, 6, and 12. Node 11 has a partner link with node 10 and directly connects to nodes 0, 3, 7, and 9, and node 12 directly connects to nodes 4, 7, 8, and 10. An exemplary routing table for this network is provided below.

| FROM\TO | 0 | 1 | 2 | 3 | 4 | 5 | 6 | 7 | 8 | 9 | 10 | 11 | 12 |
|---|---|---|---|---|---|---|---|---|---|---|---|---|---|
| 0 | | — | 4 | 8 | — | 4 | — | 6 | — | 8 | 11 | — | 4 |
| 1 | — | | 9 | 5 | 5 | — | 7 | — | 9 | — | — | 10 | 7 |
| 2 | 6 | 10 | | — | — | 4 | — | 6 | 9 | — | — | 10 | 10 |
| 3 | 11 | 7 | — | | 5 | — | 7 | — | — | 8 | 11 | — | 7 |
| 4 | — | 0 | — | 2 | | — | 0 | 12 | 9 | — | 12 | 0 | — |
| 5 | 1 | — | 3 | — | — | | 6 | — | 8 | 1 | 3 | 8 |
| 6 | — | 0 | — | 2 | 5 | — | | — | 0 | 2 | — | 10 | 10 |
| 7 | 1 | — | 3 | — | 12 | 3 | — | | 3 | 11 | 11 | — | — |
| 8 | — | 0 | 3 | — | 5 | — | 0 | 12 | | — | 12 | 0 | — |
| 9 | 1 | — | — | 2 | — | 4 | 2 | 1 | — | | 11 | — | 4 |
| 10 | 1 | — | — | 2 | 2 | 6 | — | 6 | 12 | 2 | | — | — |
| 11 | — | 0 | 3 | — | 0 | 3 | 7 | — | 9 | — | — | | 7 |
| 12 | 8 | 10 | 4 | 8 | — | 4 | 7 | — | — | 8 | — | 10 | |

Figure 12:
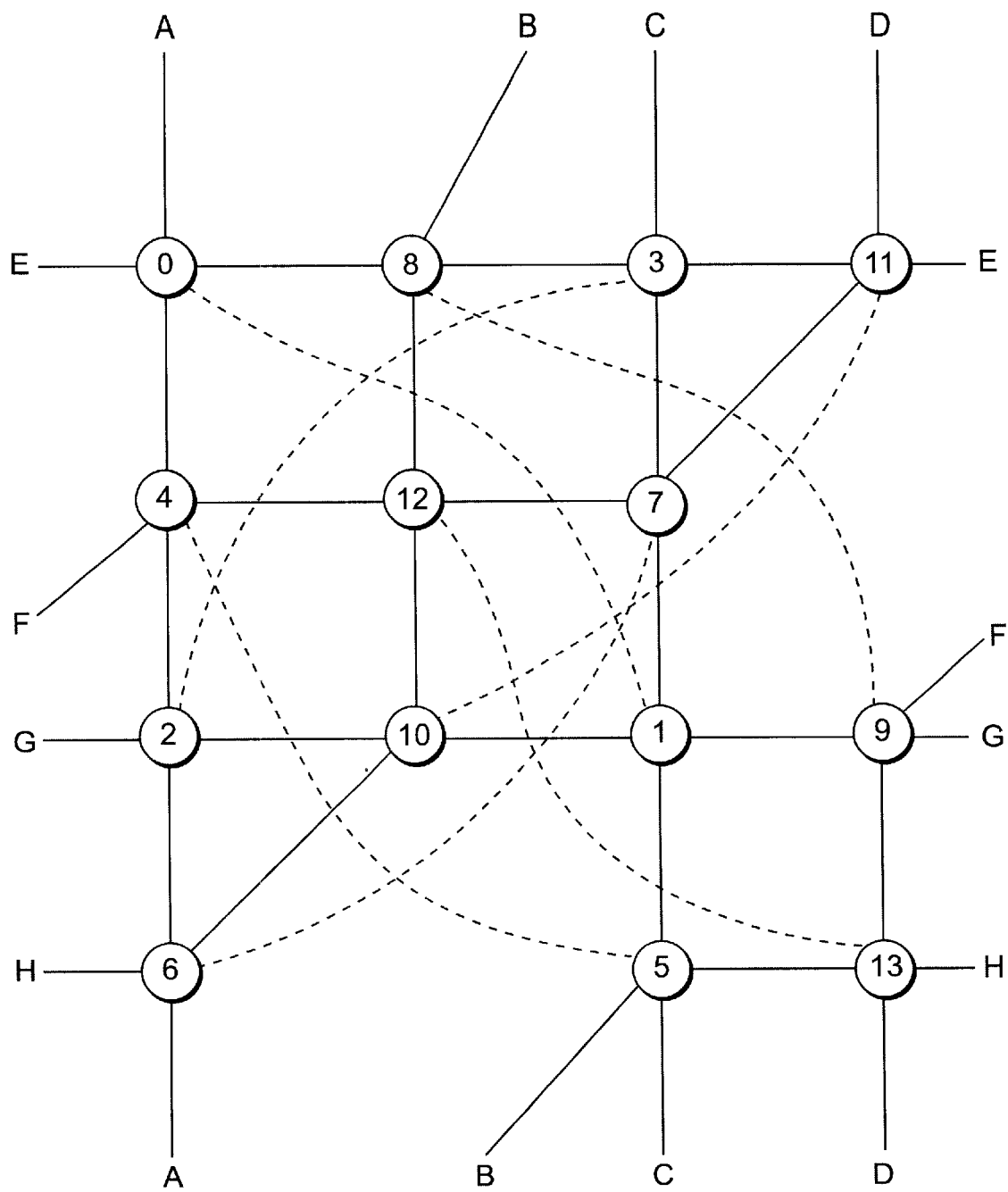
FIG. 12 depicts a network topology for a network of 14 nodes in accordance with methods and systems consistent with the present invention.

FIG. 12 depicts a network topology for a network of 14 nodes in accordance with methods and systems consistent with the present invention. As shown in FIG. 12, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 8, and 13. Node 6 has a partner link with node 7 and directly connects to nodes 0, 2, 10, and 13. Node 7 has a partner link with node 6 and directly connects to nodes 1, 3, 11, and 12. Node 8 has a partner link with node 9 and directly connects to nodes 0, 3, 5, and 12. Node 9 has a partner link with node 8 and directly connects to nodes 1, 2, 4, and 13. Node 10 has a partner link with node 11 and directly connects to nodes 1, 2, 6, and 12. Node 11 has a partner link with node 10 and directly connects to nodes 0, 3, 7, and 13. Node 12 has a partner link with node 13 and directly connects to nodes 4, 7, 8, and 10, and node 13 has a partner link with node 12 and directly connects to nodes 5, 6, 9, and 11. An exemplary routing table for this network is provided below.

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | | — | 4 | 8 | — | 4 | — | 6 | — | 8 | 11 | — | 8 | 6 |
| 1 | — | | 9 | 5 | 5 | — | 7 | — | 9 | — | — | 10 | 7 | 5 |
| 2 | 6 | 10 | | — | — | 4 | — | 6 | 9 | — | — | 10 | 10 | 6 |
| 3 | 11 | 7 | — | | 5 | — | 7 | — | — | 8 | 11 | — | 7 | 11 |

-continued

| FROM\TO | 0 | 1 | 2 | 3 | 4 | 5 | 6 | 7 | 8 | 9 | 10 | 11 | 12 | 13 |
|---------|---|---|---|---|---|---|---|---|---|---|----|----|----|----|
| 4 | — | 0 | — | 2 | — | — | 0 | 12 | 9 | — | 12 | 0 | — | 12 |
| 5 | 1 | — | 3 | — | — | — | 13 | 1 | — | 8 | 1 | 13 | 13 | — |
| 6 | — | 0 | — | 2 | 2 | 13 | — | — | 0 | 2 | — | 10 | 13 | — |
| 7 | 1 | — | 3 | — | 12 | 3 | — | — | 3 | 1 | 11 | — | — | 12 |
| 8 | — | 0 | 3 | — | 5 | — | 0 | 12 | — | — | 12 | 0 | — | 12 |
| 9 | 1 | — | — | 2 | — | 4 | 13 | 1 | — | — | 1 | 13 | 13 | — |
| 10 | 1 | — | — | 2 | 2 | 1 | — | 6 | 12 | 2 | — | — | — | 12 |
| 11 | — | 0 | 3 | — | 0 | 3 | 7 | — | 3 | 13 | — | — | 13 | — |
| 12 | 8 | 10 | 4 | 8 | — | 4 | 7 | — | — | 8 | — | 10 | — | — |
| 13 | 11 | 9 | 9 | 5 | 5 | — | — | 6 | 9 | — | 11 | — | — | — |

Figure 13:
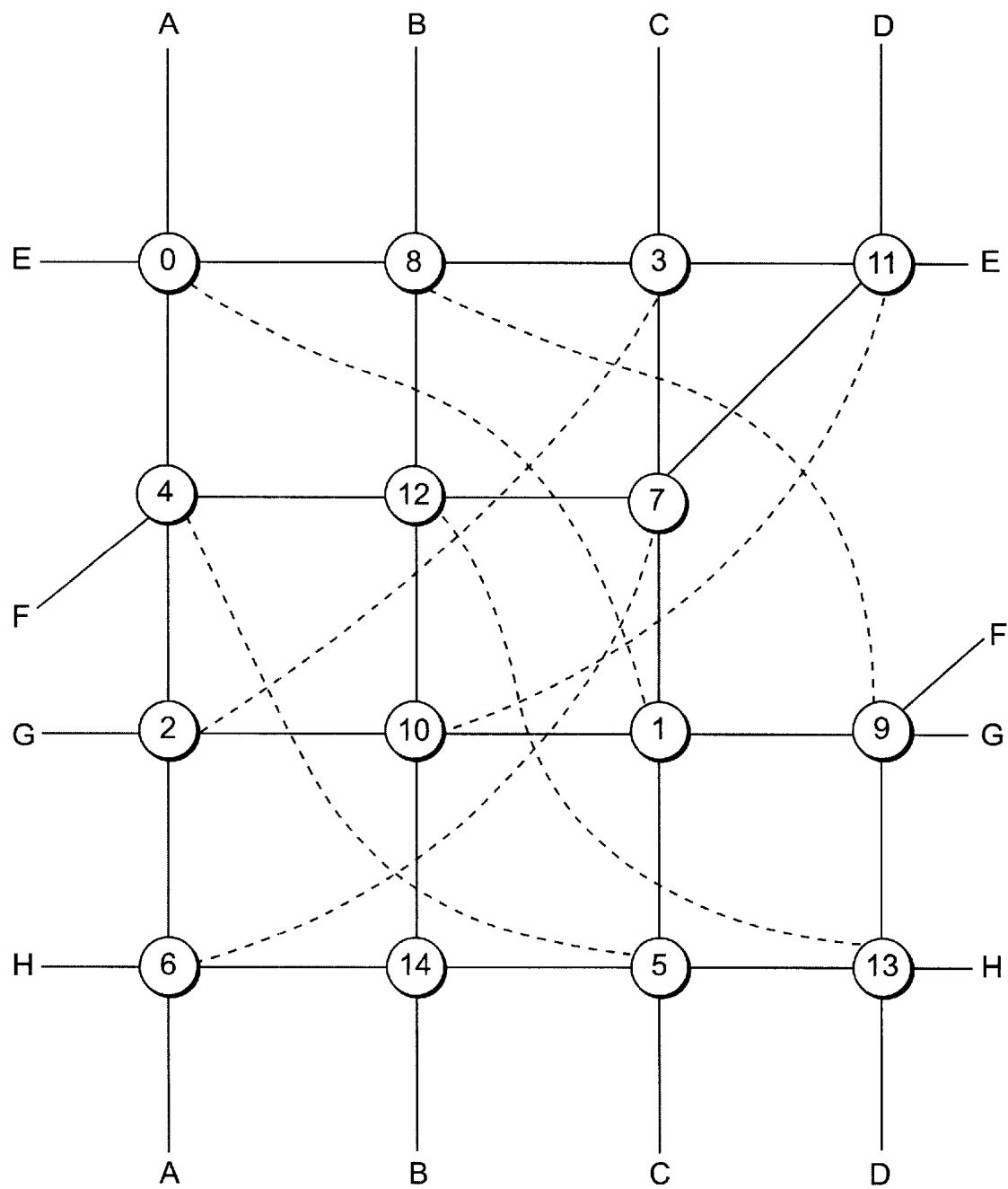
FIG. 13 depicts a network topology for a network of 15 nodes in accordance with methods and systems consistent with the present invention.

FIG. 13 depicts a network topology for a network of 15 nodes in accordance with methods and systems consistent with the present invention. As shown in FIG. 13, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 9, and 12. Node 5 has a partner link with node 4 and directly connects to nodes 1, 3, 13, and 14. Node 6 has a partner link with node 7 and directly connects to nodes 0, 2, 13, and 14. Node 7 has a partner link with node 6 and directly connects to nodes 1, 3, 11, and 12. Node 8 has a partner link with node 9 and directly connects to nodes 0, 3, 12, and 14. Node 9 has a partner link with node 8 and directly connects to nodes 1, 2, 4, and 13. Node 10 has a partner link with node 11 and directly connects to nodes 1, 2, 12, and 14. Node 11 has a partner link with node 10 and directly connects to nodes 0, 3, 7, and 13. Node 12 has a partner link with node 13 and directly connects to nodes 4, 7, 8, and 10. Nodes 13 has a partner link with node 12 and directly connects to nodes 5, 6, 9, and 11, and node 14 directly connects to nodes 5, 6, 8, and 10. An example routing table for this network is provide below.

with the present invention. As shown in this figure, node 0 has a partner link with node 1 and directly connects to nodes 4, 6, 8, and 11. Node 1 has a partner link with node 0 and directly connects to nodes 5, 7, 9, and 10. Node 2 has a partner link with node 3 and directly connects to nodes 4, 6, 9, and 10. Node 3 has a partner link with node 2 and directly connects to nodes 5, 7, 8, and 11. Node 4 has a partner link with node 5 and directly connects to nodes 0, 2, 12, and 15. Node 5 has a partner link with node 4 and directly connects to nodes 1, 3, 13, and 14. Node 6 has a partner link with node 7 and directly connects to nodes 0, 2, 13, and 14. Node 7 has a partner link with node 6 and directly connects to nodes 1, 3, 12, and 15. Node 8 has a partner link with node 9 and directly connects to nodes 0, 3, 12, and 14. Node 9 has a partner link with node 8 and directly connects to nodes 1, 2, 13, and 15. Node 10 has a partner link with node 11 and directly connects to nodes 1, 2, 12, and 14. Node 11 has a partner link with node 10 and directly connects to nodes 0, 3, 13, and 15. Node 12 has a partner link with node 13 and directly connects to nodes 4, 7, 8, and 10. Node 13 has a partner link with node 12 and directly connects to nodes 5, 6, 9, and 11. Node 14 has a partner link with node 15 and directly connects to nodes 5, 6, 8, and 10, and node 15 has a partner link with node 14 and directly connects to nodes 4, 7, 9, and 11. An exemplary routing table for this network topology is provided below.

| FROM\TO | 0 | 1 | 2 | 3 | 4 | 5 | 6 | 7 | 8 | 9 | 10 | 11 | 12 | 13 | 14 |
|---------|---|---|---|---|---|---|---|---|---|---|----|----|----|----|----|
| 0 | — | — | 4 | 8 | — | 4 | — | 6 | — | 8 | 11 | — | 4 | 6 | 8 |
| 1 | — | — | 9 | 5 | 5 | — | 7 | — | 9 | — | — | 10 | 7 | 5 | 5 |
| 2 | 6 | 10 | — | — | — | 4 | — | 6 | 9 | — | — | 10 | 10 | 6 | 6 |
| 3 | 11 | 7 | — | — | 5 | — | 7 | — | — | 8 | 11 | — | 7 | 11 | 5 |
| 4 | — | 0 | — | 2 | — | — | 0 | 12 | 9 | — | 12 | 0 | — | 12 | 5 |
| 5 | 1 | — | 3 | — | — | — | 13 | 1 | 3 | 1 | 1 | 13 | 13 | — | — |
| 6 | — | 0 | — | 2 | 2 | 14 | — | — | 14 | 2 | 2 | 0 | 13 | — | — |
| 7 | 1 | — | 3 | — | 12 | 3 | — | — | 3 | 1 | 11 | — | — | 12 | 6 |
| 8 | — | 0 | 3 | — | 12 | 14 | 0 | 12 | — | — | 12 | 0 | — | 12 | — |
| 9 | 1 | — | — | 2 | — | 4 | 13 | 1 | — | — | 1 | 13 | 13 | — | 8 |
| 10 | 1 | — | — | 2 | 2 | 14 | 2 | 12 | 14 | 2 | — | — | — | 12 | — |
| 11 | — | 0 | 3 | — | 0 | 3 | 7 | — | 3 | 13 | — | — | 13 | — | 10 |
| 12 | 8 | 10 | 4 | 8 | — | 4 | 7 | — | — | 8 | — | 10 | — | — | 8 |
| 13 | 11 | 9 | 9 | 5 | 5 | — | — | 6 | 9 | — | 11 | — | — | — | 5 |
| 14 | 6 | 10 | 10 | 8 | 5 | — | — | 6 | — | 8 | — | 10 | 10 | 6 | — |

Figure 14:
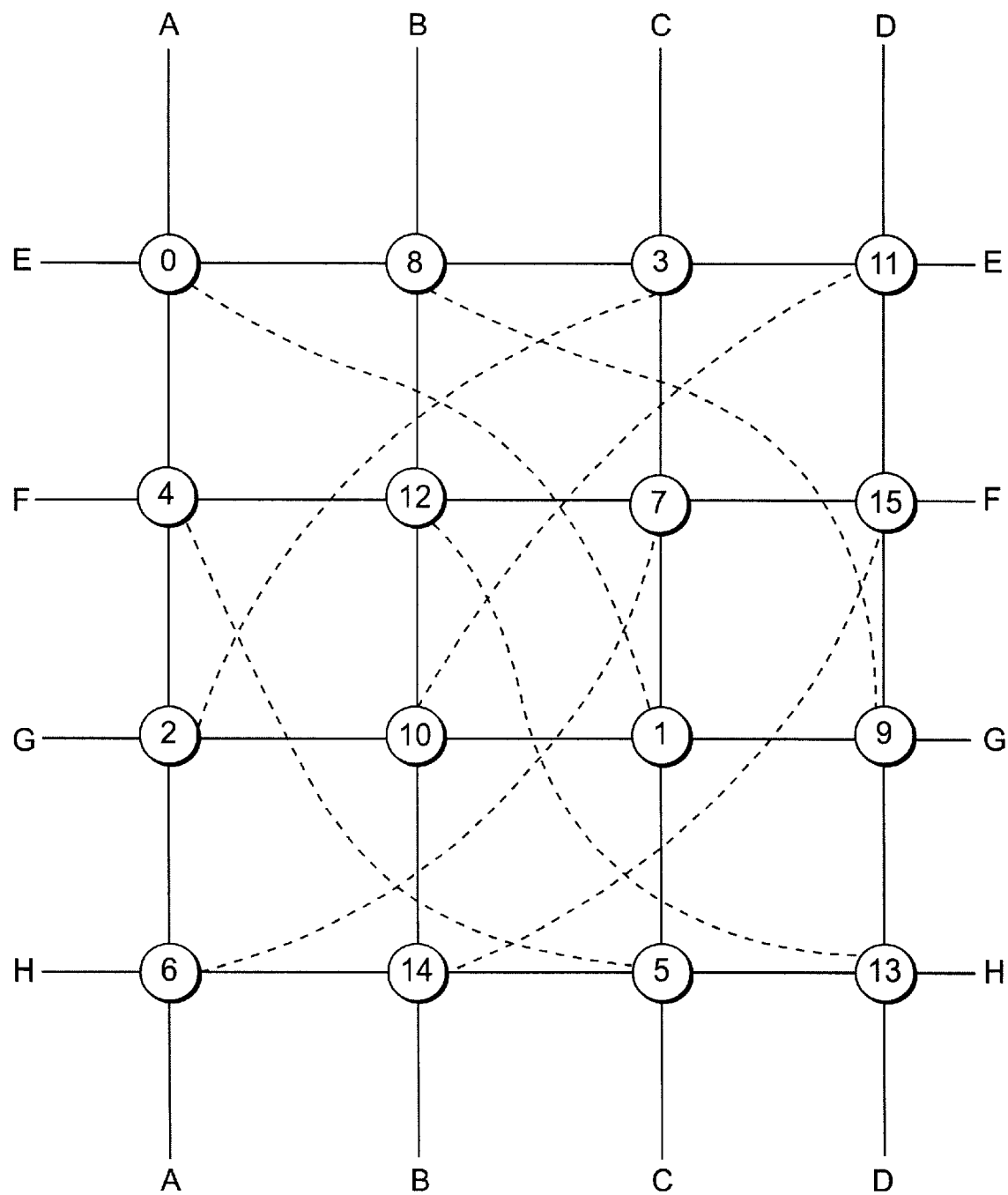
FIG. 14 depicts a network topology for a network of 16 nodes in accordance with methods and systems consistent with the present invention.

FIG. 14 depicts a network topology for a network of 16 nodes in accordance with methods and systems consistent

| FROM\TO | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 |   | — | 4 | 8 | — | 4 | — | 6 | — | 8 | 11 | — | 4 | 6 | 8 | 4 |
| 1 | — |   | 9 | 5 | 5 | — | 7 | — | 9 | — | — | 10 | 7 | 5 | 5 | 9 |
| 2 | 6 | 10 |   | — | — | 4 | — | 6 | 9 | — | — | 10 | 10 | 6 | 6 | 4 |
| 3 | 11 | 7 | — |   | 5 | — | 7 | — | — | 8 | 11 | — | 7 | 11 | 5 | 7 |
| 4 | — | 0 | — | 2 |   | — | 0 | 12 | 0 | 2 | 12 | 0 | — | 12 | 15 | — |
| 5 | 1 | — | 3 | — | — |   | 13 | 1 | 3 | 1 | 1 | 13 | 13 | — | — | 14 |
| 6 | — | 0 | — | 2 | 2 | 14 |   | — | 14 | 2 | 2 | 0 | 13 | — | — | 14 |
| 7 | 1 | — | 3 | — | 15 | 3 | — |   | 3 | 15 | 1 | 3 | — | 12 | 15 | — |
| 8 | — | 0 | 3 | — | 12 | 14 | 0 | 12 |   | — | 12 | 0 | — | 12 | — | 14 |
| 9 | 1 | — | — | 2 | 15 | 13 | 13 | 1 | — |   | 1 | 13 | 13 | — | 15 | — |
| 10 | 1 | — | — | 2 | 2 | 14 | 14 | 12 | 14 | 2 |   | — | — | 12 | — | 14 |
| 11 | — | 0 | 3 | — | 15 | 3 | 13 | 15 | 3 | 15 | — |   | 13 | — | 15 | — |
| 12 | 8 | 10 | 4 | 8 | — | 4 | 7 | — | — | 8 | — | 10 |   | — | 8 | 4 |
| 13 | 11 | 9 | 9 | 5 | 5 | — | — | 6 | 9 | — | 11 | — | — |   | 5 | 9 |
| 14 | 6 | 10 | 10 | 8 | 5 | — | — | 6 | — | 8 | — | 10 | 10 | 6 |   | — |
| 15 | 11 | 7 | 9 | 11 | — | 4 | 7 | — | 9 | — | 11 | — | 7 | 11 | — |   |

Upgrade/Downgrade of Network Topologies

The above-described network topologies have been selected to simplify the reconfiguration of the network. As described below, for many of the network topologies, reconfiguring the network to either add or remove a node requires the minimal amount of recabling necessary. For example, to add a node to the seven-node network topology, two links are removed and five links (including one partner link) are added to connect the eighth node. This is the minimal amount of recabling that can be done when adding a node in an environment where each node has 5 ports while also attempting to maximize port usage. Additionally, when reconfiguring a network in accordance with methods and systems consistent with the present invention, the reconfiguration occurs without bringing down the network. Instead, the network remains operational during the reconfiguration, with only a minimal interruption.

Figure 15:
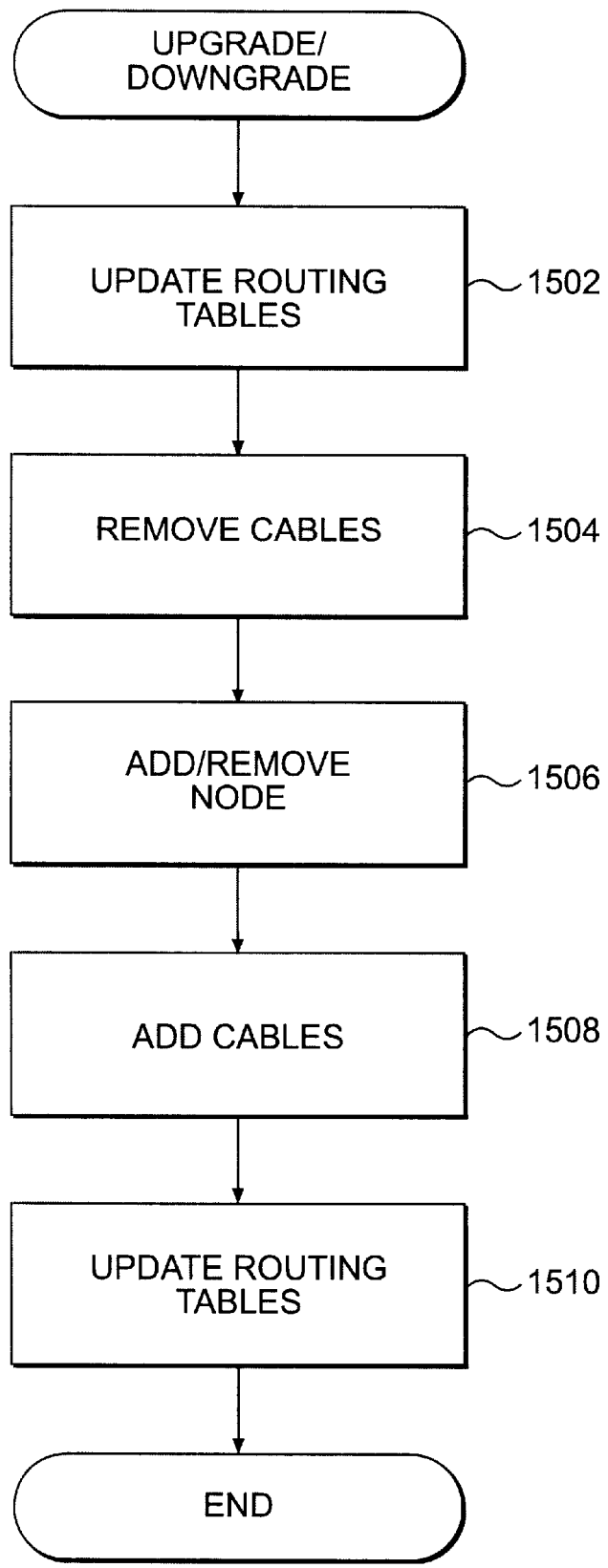
FIG. 15 depicts a flowchart of the steps performed when reconfiguring one of the networks depicted in FIGS. 5–14.

FIG. 15 depicts a flowchart of the steps performed when reconfiguring one of the network topologies in accordance with methods and systems consistent with the present invention. When performing an upgrade or downgrade, the administrator, from an administrator's console (e.g., one of the nodes), sends to the routing software on all of the nodes a signal, including an interim routing table for use in routing traffic around the part of the network affected by the upgrade or downgrade (step 1502). The interim routing tables for each network topology are provided below. While the routing tables are updated, network traffic is stalled for a small amount of time, on the order of milliseconds. During this time, the nodes buffer network traffic, so no data loss occurs.

After updating the routing tables, the network administrator removes the cables from the affected area of the network (step 1504). The particular cables removed for each network topology are described below. This step may take on the order of tens of minutes or even a number of hours. Next, the network administrator adds or removes the appropriate node (step 1506), adds the appropriate cables (step 1508), and then sends new routing tables to each of the nodes of the network that either utilize the new node or avoid the removed node (step 1510). While updating the routing tables, network traffic stalls momentarily while the new routing tables replace the interim routing tables, and then network traffic resumes using these tables. By reconfiguring the network in this manner, the network is twice interrupted for very short periods of time and remains effectively operational, thus providing a virtually hot upgrade or downgrade.

Described below are the upgrade sequences for adding a node to a network of between 6–15 nodes. One skilled in the art will appreciate that downgrading occurs by reversing the upgrade sequences.

Upgrading from 6 Nodes to 7 Nodes

When upgrading from 6 nodes to 7 nodes, the network administrator utilizes the interim routing table provided below, removes links 2-0 and 4-3, and then adds links 6-0, 6-2, 6-3, and 6-4. After adding these links, the network administrator utilizes the routing table (described above) for a network of 7 nodes.

| FROM\TO | 0 | 1 | 2 | 3 | 4 | 5 |
|---|---|---|---|---|---|---|
| 0 |   | — | 3 | — | — | — |
| 1 | — |   | — | — | — | — |
| 2 | 1 | — |   | — | — | — |
| 3 | — | — | — |   | 5 | — |
| 4 | — | — | — | 2 |   | — |
| 5 | — | — | — | — | — |   |

Upgrading from 7 Nodes to 8 Nodes

When upgrading from 7 nodes to 8 nodes, the network administrator utilizes the interim routing table provided below, removes links 3-1 and 5-2, and then adds links 7-1, 7-2, 7-3, 7-5, and 7-6. After adding these links, the network administrator utilizes the routing table (described above) for a network of 8 nodes.

| FROM\TO | 0 | 1 | 2 | 3 | 4 | 5 | 6 |
|---|---|---|---|---|---|---|---|
| 0 |   | — | 3 | — | — | — | — |
| 1 | — |   | — | 2 | — | — | 4 |
| 2 | 1 | — |   | — | — | 4 | — |
| 3 | — | 0 | — |   | 5 | — | — |
| 4 | — | — | — | 2 |   | — | — |
| 5 | — | — | 3 | — | — |   | 3 |
| 6 | — | 0 | — | — | — | 4 |   |

Upgrading from 8 Nodes to 9 Nodes

To perform this upgrade, the network administrator utilizes the interim routing table provided below, removes links 5-0 and 6-3, adds links 8-0, 8-3, 8-5, and 8-6, and then utilizes the routing table described above for a network of 9 nodes.

| FROM\TO | 0 | 1 | 2 | 3 | 4 | 5 | 6 | 7 |
|---|---|---|---|---|---|---|---|---|
| 0 |   | — | 3 | — | — | 4 | — | 6 |
| 1 | — |   | — | 2 | — | — | 7 | — |
| 2 | 1 | — |   | — | — | 4 | — | — |
| 3 | — | 0 | — |   | 5 | — | 7 | — |
| 4 | — | — | — | 2 |   | — | — | 6 |
| 5 | 1 | — | 3 | — | — |   | 7 | — |
| 6 | — | 0 | — | 2 | — | 4 |   | — |
| 7 | 1 | — | — | — | 5 | — | — |   |

Upgrading from 9 Nodes to 10 Nodes

To perform this upgrade, the network administrator utilizes the interim routing table provided below, removes links 4-1 and 7-2, adds links 9-1, 9-2, 9-4, 9-7, and 9-8, and then utilizes the routing table described above for a network of 10 nodes.

| FROM\TO | 0 | 1 | 2 | 3 | 4 | 5 | 6 | 7 | 8 |
|---|---|---|---|---|---|---|---|---|---|
| 0 |   | — | 3 | — | — | 4 | — | 6 | — |
| 1 | — |   | — | 2 | 5 | — | 7 | — | 5 |
| 2 | 1 | — |   | — | — | 4 | — | 6 | 6 |
| 3 | — | 0 | — |   | 5 | — | 7 | — | — |
| 4 | — | 0 | — | 2 |   | — | — | 6 | 0 |
| 5 | 1 | — | 3 | — | — |   | 7 | — | — |
| 6 | — | 0 | — | 2 | — | 4 |   | — | — |
| 7 | 1 | — | 3 | — | 5 | — | — |   | 3 |
| 8 | — | 0 | 3 | — | 5 | — | — | 6 |   |

Upgrading from 10 Nodes to 11 Nodes

To upgrade from 10 nodes to 11 nodes, the network administrator utilizes the interim routing table provided below, removes links 2-1, 6-4, and 7-5, adds links 10-1, 10-2, 7-4, 10-6, and then utilizes the routing table described above for a network of 11 nodes.

| FROM\TO | 0 | 1 | 2 | 3 | 4 | 5 | 6 | 7 | 8 | 9 |
|---|---|---|---|---|---|---|---|---|---|---|
| 0 |   | — | 3 | — | — | 4 | — | 6 | — | 8 |
| 1 | — |   | 9 | 5 | 5 | — | 7 | — | 9 | — |
| 2 | 6 | 9 |   | — | — | 4 | — | 6 | 9 | — |
| 3 | — | 0 | — |   | 5 | — | 7 | — | — | 8 |
| 4 | — | 0 | — | 2 |   | — | 0 | 9 | 9 | — |
| 5 | 1 | — | 3 | — | — |   | 8 | 1 | — | 8 |
| 6 | — | 0 | — | 2 | 2 | 8 |   | — | — | 8 |
| 7 | 1 | — | 3 | — | 9 | 3 | — |   | 9 | — |
| 8 | — | 0 | 3 | — | 5 | — | — | 6 |   | — |
| 9 | 1 | — | — | 2 | — | 4 | 7 | — | — |   |

Upgrading from 11 Nodes to 12 Nodes

To upgrade form 11 nodes to 12 nodes, the network administrator utilizes the interim routing table provided below, removes links 3-0 and 7-4, adds links 11-0, 11-3, 11-4, 11-7, and 11-10, and the utilizes the routing table described above for a network of 12 nodes.

| FROM\TO | 0 | 1 | 2 | 3 | 4 | 5 | 6 | 7 | 8 | 9 | 10 |
|---|---|---|---|---|---|---|---|---|---|---|---|
| 0 |   | — | 4 | 8 | — | 4 | — | 6 | — | 8 | 6 |
| 1 | — |   | 9 | 5 | 5 | — | 7 | — | 9 | — | — |
| 2 | 6 | 10 |   | — | — | 4 | — | 6 | 9 | — | — |
| 3 | 8 | 7 | — |   | 5 | — | 7 | — | — | 8 | 5 |
| 4 | — | 0 | — | 2 |   | — | 0 | 9 | 9 | — | 2 |
| 5 | 1 | — | 3 | — | — |   | 8 | 1 | — | 8 | — |
| 6 | — | 0 | — | 2 | 2 | 8 |   | — | — | 8 | — |
| 7 | 1 | — | 3 | — | 9 | 3 | — |   | 9 | — | 1 |
| 8 | — | 0 | 3 | — | 5 | — | — | 6 |   | — | 6 |
| 9 | 1 | — | — | 2 | — | 4 | 7 | — | — |   | 1 |
| 10 | 1 | — | — | 2 | 5 | — | — | 6 | 6 | 2 |   |

Upgrading from 12 Nodes to 13 Nodes

To perform this upgrade, the network administrator utilizes the interim routing table provided below, removes links 11-4, 10-5, 8-6, and 9-7, adds links 12-4, 9-5, 11-6, 12-7, 12-8, and 12-10, and then utilizes the routing table described above for a network of 13 nodes. The entry at the intersection of row 4 and column 7, for example, indicates that data from node 4 is sent to node 7 by way of node 0 and then node 6.

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 |   | — | 4 | 8 | — | 4 | — | 6 | — | 8 | 11 | — |
| 1 | — |   | 9 | 5 | 5 | — | 7 | — | 9 | — | — | 10 |
| 2 | 4 | 10 |   | — | — | 4 | — | 6 | 9 | — | — | 10 |
| 3 | 8 | 7 | — |   | 5 | — | 7 | — | — | 8 | 11 | — |
| 4 | — | 0 | — | 2 |   | — | 0 | 0.6 | 9 | — | 2 | 0 |
| 5 | 1 | — | 3 | — | — |   | 1.7 | 1 | — | 8 | 1 | 3 |
| 6 | — | 0 | — | 2 | 2 | 2.4 |   | — | 0 | 2 | — | 10 |
| 7 | 1 | — | 3 | — | 3.5 | 3 | — |   | 3 | 1 | 11 | — |
| 8 | — | 0 | 3 | — | 5 | — | 0 | 3 |   | — | 0.11 | 0 |
| 9 | 1 | — | — | 2 | — | 4 | 2 | 1 | — |   | 1 | 1.10 |
| 10 | 1 | — | — | 2 | 2 | 1 | — | 6 | 2.9 | 2 |   | — |
| 11 | — | 0 | 3 | — | 0 | 3 | 7 | — | 3 | 3.8 | — |   |

Upgrading from 13 Nodes to 14 Nodes

To perform this upgrade, the network administrator utilizes the interim routing table provided below, removes links 9-5 and 11-6, adds links 13-5, 13-6, 13-9, 13-11, and 13-12, and then utilizes the routing table described above for a network of 14 nodes.

| FROM\TO | 0 | 1 | 2 | 3 | 4 | 5 | 6 | 7 | 8 | 9 | 10 | 11 | 12 |
|---|---|---|---|---|---|---|---|---|---|---|---|---|---|
| 0 |   | — | 4 | 8 | — | 4 | — | 6 | — | 8 | 11 | — | 4 |
| 1 | — |   | 9 | 5 | 5 | — | 7 | — | 9 | — | — | 10 | 7 |
| 2 | 6 | 10 |   | — | — | 4 | — | 6 | 9 | — | — | 10 | 10 |
| 3 | 8 | 7 | — |   | 5 | — | 7 | — | — | 8 | 11 | — | 7 |
| 4 | — | 0 | — | 2 |   | — | 0 | 12 | 9 | — | 12 | 0 | — |
| 5 | 1 | — | 3 | — | — |   | 1.7 | 1 | — | 8 | 1 | 3 | 8 |
| 6 | — | 0 | — | 2 | 2 | 2.4 |   | — | 0 | 2 | — | 10 | 10 |
| 7 | 1 | — | 3 | — | 12 | 3 | — |   | 3 | 1 | 11 | — | — |
| 8 | — | 0 | 3 | — | 5 | — | 0 | 12 |   | — | 12 | 0 | — |
| 9 | 1 | — | — | 2 | — | 4 | 2 | 1 | — |   | 1 | 1.10 | 4 |
| 10 | 1 | — | — | 2 | 2 | 1 | — | 6 | 12 | 2 |   | — | — |
| 11 | — | 0 | 3 | — | 0 | 3 | 7 | — | 3 | 3.8 | — |   | 7 |
| 12 | 8 | 10 | 4 | 8 | — | 4 | 7 | — | — | 8 | — | 10 |   |

Upgrading from 14 Nodes to 15 Nodes

To perform this upgrade, the network administrator utilizes the interim routing table provided below, removes links 8-5 and 10-6, adds links 14-5, 14-6, 14-8, and 14-10, and then utilizes the routing table described above for a network of 15 nodes.

Upgrading from 6 Nodes to 8 Nodes

To upgrade form six nodes to eight nodes, the network administrator utilizes the interim routing table provided below, removes links 2-0, 4-3, 3-1, and 5-2, adds links 6-0, 6-2, 6-3, 6-4, 7-1, 7-2, 7-3, 7-5, and 7-6, and then utilizes the routing table described above for a network of 8 nodes.

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0  | —  | —  | 4 | 8 | — | 4  | — | 6  | — | 8  | 11 | —  | 4  | 6  |
| 1  | —  | —  | 9 | 5 | 5 | —  | 7 | —  | 9 | —  | —  | 10 | 7  | 9  |
| 2  | 6  | 10 | — | — | 4 | —  | 6 | 9  | — | —  | 10 | 10 | 6  | —  |
| 3  | 11 | 7  | — | — | 5 | —  | 7 | —  | — | 8  | 11 | —  | 7  | 11 |
| 4  | —  | 0  | — | 2 | — | —  | 0 | 12 | 9 | —  | 12 | 0  | —  | 12 |
| 5  | 1  | —  | 3 | — | — | —  | 13| 1  | 3 | 1  | 1  | 13 | 13 | —  |
| 6  | —  | 0  | — | 2 | 2 | 13 | — | —  | 0 | 2  | 2  | 0  | 13 | —  |
| 7  | 1  | —  | 3 | — | 12| 3  | — | —  | 3 | 1  | 11 | —  | —  | 12 |
| 8  | —  | 0  | 3 | — | 12| 3  | 0 | 12 | — | —  | 12 | 0  | —  | 12 |
| 9  | 1  | —  | — | 2 | — | 4  | 13| 1  | — | —  | 1  | 13 | 13 | —  |
| 10 | 1  | —  | — | 2 | 2 | 1  | 2 | 12 | 12| 2  | —  | —  | —  | 12 |
| 11 | —  | 0  | 3 | — | 0 | 3  | 7 | —  | 3 | 13 | —  | —  | 13 | —  |
| 12 | 8  | 10 | 4 | 8 | — | 4  | 7 | —  | — | 8  | —  | 10 | —  | —  |
| 13 | 11 | 9  | 9 | 5 | 5 | —  | — | 6  | 9 | —  | 11 | —  | —  | —  |

Upgrading from 15 Nodes to 16 Nodes

When upgrading from 15 nodes to 16 nodes, the network administrator utilizes the interim routing table provided below, removes links 9-4 and 11-7, adds links 15-4, 15-7, 15-9, 15-11, and 15-14, and then utilizes the routing table described above for a network of 16 nodes.

| FROM\TO | 0 | 1 | 2 | 3 | 4 | 5 |
|---|---|---|---|---|---|---|
| 0 | — | — | 3 | — | — | — |
| 1 | — | — | — | 2 | — | — |
| 2 | 1 | — | — | — | — | 4 |
| 3 | — | 0 | — | — | 5 | — |
| 4 | — | — | — | 2 | — | — |
| 5 | — | — | 3 | — | — | — |

| FROM\TO | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0  | —  | —  | 4  | 8 | — | 4  | — | 6  | — | 8  | 11 | —  | 4  | 6  | 8  |
| 1  | —  | —  | 9  | 5 | 5 | —  | 7 | —  | 9 | —  | —  | 10 | 7  | 5  | 5  |
| 2  | 6  | 10 | —  | — | — | 4  | — | 6  | 9 | —  | —  | 10 | 10 | 6  | 6  |
| 3  | 11 | 7  | —  | — | 5 | —  | 7 | —  | — | 8  | 11 | —  | 7  | 11 | 5  |
| 4  | —  | 0  | —  | 2 | — | —  | 0 | 12 | 0 | 2  | 12 | 0  | —  | 12 | 5  |
| 5  | 1  | —  | 3  | — | — | —  | 13| 1  | 3 | 1  | 1  | 13 | 13 | —  | —  |
| 6  | —  | 0  | —  | 2 | 2 | 14 | — | —  | 14| 2  | 2  | 0  | 13 | —  | —  |
| 7  | 1  | —  | 3  | — | 12| 3  | — | —  | 3 | 1  | 1  | 3  | —  | 12 | 6  |
| 8  | —  | 0  | 3  | — | 12| 14 | 0 | 12 | — | —  | 12 | 0  | —  | 12 | —  |
| 9  | 1  | —  | —  | 2 | 2 | 13 | 13| 1  | — | —  | 1  | 13 | 13 | —  | 8  |
| 10 | 1  | —  | —  | 2 | 2 | 14 | 2 | 12 | 14| 2  | —  | —  | —  | 12 | —  |
| 11 | —  | 0  | 3  | — | 0 | 3  | 13| 3  | 3 | 13 | —  | —  | 13 | —  | 10 |
| 12 | 8  | 10 | 4  | 8 | — | 4  | 7 | —  | — | 8  | —  | 10 | —  | —  | 8  |
| 13 | 11 | 9  | 9  | 5 | 5 | —  | — | 6  | 9 | —  | 11 | —  | —  | —  | 5  |
| 14 | 6  | 10 | 10 | 8 | 5 | —  | — | 6  | — | 8  | —  | 10 | 10 | 6  | —  |

Upgrading 2 Nodes at a Time

Because the data processing system suitable for use with methods and systems consistent with the present invention may contain two nodes, the network topologies described above can be easily upgraded two nodes at a time when the network initially has an even number of nodes. These two additional nodes within the same data processing system. As described in detail below, when adding two nodes, the network administrator removes four links from the network topology and adds nine new links, including an additional link (a partner link) between the two nodes. One skilled in the art will appreciate that the below-described upgrade sequences can be reversed to remove two partner at a time.

Upgrading from 8 Nodes to 10 Nodes

To perform this upgrade, the network administrator utilizes the interim routing table provided below, removes links 5-0, 6-3, 4-1, and 7-2, adds links 8-0, 8-3, 8-5, 8-6, 9-1, 9-2, 9-4, 9-7, and 9-8, and then utilizes the routing table described above for a network of 10 nodes.

| FROM\TO | 0 | 1 | 2 | 3 | 4 | 5 | 6 | 7 |
|---|---|---|---|---|---|---|---|---|
| 0 | — | — | 3 | — | — | 4 | — | 6 |
| 1 | — | — | — | 2 | 5 | — | 7 | — |
| 2 | 1 | — | — | — | — | 4 | — | 6 |
| 3 | — | 0 | — | — | 5 | — | 7 | — |
| 4 | — | 0 | — | 2 | — | — | — | 6 |
| 5 | 1 | — | 3 | — | — | — | 7 | — |
| 6 | — | 0 | — | 2 | — | 4 | — | — |
| 7 | 1 | — | 3 | — | 5 | — | — | — |

Upgrading from 10 nodes to 12 Nodes

To perform this upgrade, the network administrator utilizes the interim routing table provided below, removes links 2-1, 6-4, 7-5, and 3-0, adds links 10-1, 10-2, 10-5, 10-6, 11-0, 11-3, 11-4, 11-7, and 11-10, and then utilizes the routing table described above for a network of 12 nodes.

| FROM\TO | 0 | 1 | 2 | 3 | 4 | 5 | 6 | 7 | 8 | 9 |
|---|---|---|---|---|---|---|---|---|---|---|
| 0 | — | — | 4 | 8 | — | 4 | — | 6 | — | 8 |
| 1 | — | — | 9 | 5 | 5 | — | 7 | — | 9 | — |
| 2 | 6 | 9 | — | — | 4 | — | 6 | 9 | — | — |
| 3 | 8 | 7 | — | — | 5 | — | 7 | — | — | 8 |
| 4 | — | 0 | — | 2 | — | — | 0 | 9 | 9 | — |
| 5 | 1 | — | 3 | — | — | — | 8 | 1 | — | 8 |
| 6 | — | 0 | — | 2 | 2 | 8 | — | — | — | 8 |
| 7 | 1 | — | 3 | — | 9 | 3 | — | — | 9 | — |
| 8 | — | 0 | 3 | — | 5 | — | — | 6 | — | — |
| 9 | 1 | — | — | 2 | — | 4 | 7 | — | — | — |

Upgrading from 12 Nodes to 14 Nodes

To perform this upgrade, the network administrator utilizes the interim routing table provided below, removes links 11-4, 10-5, 8-6, and 9-7, adds links 12-4, 12-7, 12-8, 12-10, 13-5, 13-6, 13-9, 13-11, and 13-12, and then utilizes the routing table described above for a network of 14 nodes.

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 | — | — | 4 | 8 | — | 4 | — | 6 | — | 8 | 11 | — |
| 1 | — | — | 9 | 5 | 5 | — | 7 | — | 9 | — | — | 10 |
| 2 | 4 | 10 | — | — | 4 | — | 6 | 9 | — | — | — | 10 |
| 3 | 8 | 7 | — | — | 5 | — | 7 | — | — | 8 | 11 | — |
| 4 | — | 0 | — | 2 | — | — | 0 | 0.6 | 9 | — | 2 | 0 |
| 5 | 1 | — | 3 | — | — | — | 1.7 | 1 | — | 8 | 1 | 3 |
| 6 | — | 0 | — | 2 | 2 | 2.4 | — | — | 0 | 2 | — | 10 |
| 7 | 1 | — | 3 | — | 3.5 | 3 | — | — | 3 | 1 | 11 | — |
| 8 | — | 0 | 3 | — | 5 | — | 0 | 3 | — | — | 0.11 | 0 |
| 9 | 1 | — | — | 2 | — | 4 | 2 | 1 | — | — | 1 | 1.10 |
| 10 | 1 | — | — | 2 | 2 | 1 | — | 6 | 2.9 | 2 | — | — |
| 11 | — | 0 | 3 | — | 0 | 3 | 7 | — | 3 | 3.8 | — | — |

Upgrading from 14 Nodes to 16 Nodes

To perform this upgrade, the network administrator utilizes the interim routing table provided below, removes links 8-5, 10-6, 9-4, and 11-7, adds links 14-5, 14-6, 14-8, 14-10, 15-4, 15-7, 15-9, 15-11, and 15-14, and then utilizes the routing table described above for a network of 16 nodes.

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | — | — | 4 | 8 | — | 4 | — | 6 | — | 8 | 11 | — | 8 | 6 |
| 1 | — | — | 9 | 5 | 5 | — | 7 | — | 9 | — | — | 10 | 7 | 5 |
| 2 | 6 | 10 | — | — | 4 | — | 6 | 9 | — | — | — | 10 | 10 | 6 |
| 3 | 11 | 7 | — | — | 5 | — | 7 | — | — | 8 | 11 | — | 7 | 11 |
| 4 | — | 0 | — | 2 | — | — | 0 | 12 | 0 | 2 | 12 | 0 | — | 12 |
| 5 | 1 | — | 3 | — | — | — | 13 | 1 | 3 | 1 | 1 | 13 | 13 | — |
| 6 | — | 0 | — | 2 | 2 | 13 | — | — | 0 | 2 | 2 | 0 | 13 | — |
| 7 | 1 | — | 3 | — | 12 | 3 | — | — | 3 | 1 | 1 | 3 | — | 12 |
| 8 | — | 0 | 3 | — | 12 | 3 | 0 | 12 | — | — | 12 | 0 | — | 12 |
| 9 | 1 | — | — | 2 | 2 | 13 | 13 | 1 | — | — | 1 | 13 | 13 | — |
| 10 | 1 | — | — | 2 | 2 | 1 | 2 | 12 | 12 | 2 | — | — | — | 12 |
| 11 | — | 0 | 3 | — | 0 | 3 | 13 | 3 | 3 | 13 | — | — | 13 | — |
| 12 | 8 | 10 | 4 | 8 | — | 4 | 7 | — | — | 8 | — | 10 | — | — |
| 13 | 11 | 9 | 9 | 5 | 5 | — | — | 6 | 9 | — | 11 | — | — | — |

Although the present invention has been described with reference to a preferred embodiment thereof, those skilled in the art will know of various changes in form and detail which may be made without departing from the spirit and scope of the present invention as defined in the appended claims and their full scope of equivalents.

What is claimed is:

1. A method in a distributed system containing a network with nodes, each of the nodes having ports, comprising the steps of:

configuring the network to maximize usage of the ports;

rendering the network operational such that the nodes are capable of communicating via the network using static routing; and reconfiguring the network while the network remains operational, wherein the reconfiguring includes at least one of adding a new node to the network and removing at least one of the nodes from the network.

2. The method of claim 1, wherein the network includes at least seven nodes that are not fully connected, the nodes including a node 0, a node 1, a node 2, anode 3, a node 4, a node 5 and a node 6, the nodes being communicatively linked as follows:

node 0 is communicatively linked to node 1, node 3, node 4, node 5, and node 6;

node 1 is communicatively linked to node 0, node 2, node 3, node 4, and node 5;

node 2 is communicatively linked to node 1, node 3, node 4, node 5, and node 6;

node 3 is communicatively linked to node 0, node 1, node 2, node 5, and node 6;

node 4 is communicatively linked to node 0, node 1, node 2, node 5, and node 6;

node 5 is communicatively linked to node 0, node 1, node 2, node 3, and node 4; and node 6 is communicatively linked to node 0, node 2, node 3, and node 4.

3. The method of claim 1 wherein adding a new node includes:

adding a node 7 to the network.

4. The method of claim 3 wherein adding a node 7 includes:

removing the communication link between node 3 and node 1;

removing the communication link between node 5 and node 2;

communicatively linking node 7 and node 1;

communicatively linking node 7 and node 2;

communicatively linking node 7 and node 3;

communicatively linking node 7 and node 5; and communicatively linking node 7 and node 6.

5. The method of claim 1 wherein removing at least one of the nodes includes:

removing node 6 from the network.

6. The method of claim 5 wherein removing node 6 includes:

removing the communication link between node 6 and node 0;

removing the communication link between node 6 and node 2;

removing the communication link between node 6 and node 3;

removing the communication link between node 6 and node 4;

communicatively linking node 2 and node 0; and communicatively linking node 4 and node 3.

7. The method of claim 1, wherein the network comprises at least eight nodes that are not fully connected, the nodes including a node 0, a node 1, a node 2, a node 3, a node 4, a node 5, a node 6, and a node 7, the nodes being communicatively linked as follows:

node 0 is communicatively linked to node 1, node 3, node 4, node 5, and node 6;

node 1 is communicatively linked to node 0, node 2, node 4, node 5, and node 7 node 2 is communicatively linked to node 1, node 3, node 4, node 6, and node 7;

node 3 is communicatively linked to node 0, node 2, node 5, node 6, and node 7;

node 4 is communicatively linked to node 0, node 1, node 2, node 5, and node 6;

node 5 is communicatively linked to node 0, node 1, node 3, node 4, and node 7;

node 6 is communicatively linked to node 0, node 2, node 3, node 4, and node 7; and node 7 is communicatively linked to node 1, node 2, node 3, node 5, and node 6.

8. The method of claim 5 wherein adding a new node includes:

adding a node 8 to the network.

9. The method of claim 8 wherein adding node 8 includes:

removing the communication link between node 5 and node 0;

removing the communication link between node 6 and node 3;

communicatively linking node 8 and node 0;

communicatively linking node 8 and node 3;

communicatively linking node 8 and node 5; and communicatively linking node 8 and node 6.

10. The method of claim 7 wherein removing at least one of the nodes includes:

removing node 7 from the network.

11. The method of claim 10 wherein removing node 7 includes:

removing the communication link between node 7 and node 1;

removing the communication link between node 7 and node 2;

removing the communication link between node 7 and node 3;

removing the communication link between node 7 and node 5;

removing the communication link between node 7 and node 6;

communicatively linking node 3 and node 1; and communicatively linking node 5 and node 2.

12. The method of claim 7 wherein adding a new node includes:

adding a node 8 and a node 9 to the network.

13. The method of claim 12 wherein adding a node 8 and a node 9 includes the steps of:

removing the communication link between node 5 and node 0;

removing the communication link between node 6 and node 3;

removing the communication link between node 4 and node 1;

removing the communication link between node 7 and node 2;

communicatively linking node 8 and node 0;

communicatively linking node 8 and node 3;

communicatively linking node 8 and node 5;

communicatively linking node 8 and node 6;

communicatively linking node 9 and node 1;

communicatively linking node 9 and node 2;

communicatively linking node 9 and node 4;

communicatively linking node 9 and node 7; and communicatively linking node 9 and node 8.

14. The method of claim 7 wherein removing at least one of the nodes includes:

removing node 6 and node 7 from the network.

15. The method of claim 14 wherein removing nodes 6 and node 7 includes the steps of:

removing the communication link between node 6 and node 0;

removing the communication link between node 6 and node 2;

removing the communication link between node 6 and node 3;

removing the communication link between node 6 and node 4;

removing the communication link between node 7 and node 1;

removing the communication link between node 7 and node 2;

removing the communication link between node 7 and node 3;

removing the communication link between node 7 and node 5;

removing the communication link between node 7 and node 6;

communicatively linking node 2 and node 0;

communicatively linking node 4 and node 3;

communicatively linking node 3 and node 1; and communicatively linking node 5 and node 2.

16. The method of claim 1, wherein the network comprises at least nine nodes that are not fully connected, the nodes including a node 0, a node 1, a node 2, a node 3, a node 4, a node 5, a node 6, a node 7, and a node 8, the nodes being communicatively linked as follows:

node 0 is communicatively linked to node 1, node 3, node 4, node 6, and node 8;

node 1 is communicatively linked to node 0, node 2, node 4, node 5, and node 7;

node 2 is communicatively linked to node 1, node 3, node 4, node 6, and node 7;

node 3 is communicatively linked to node 0, node 2, node 5, node 7, and node 8;

node 4 is communicatively linked to node 0, node 1, node 2, node 5, and node 6;

node 5 is communicatively linked to node 1, node 3, node 4, node 7, and node 8;

node 6 is communicatively linked to node 0, node 2, node 4, node 7, and node 8;

node 7 is communicatively linked to node 1, node 2, node 3, node 5, and node 6; and node 8 is communicatively linked to node 0, node 3, node 5, and node 6.

17. The method of claim 16 wherein adding a new node includes:

adding a node 9 to the network.

18. The method of claim 15 wherein adding a node 9 includes:

removing the communication link between node 4 and node 1;

removing the communication link between node 7 and node 2;

communicatively linking node 9 and node 1;

communicatively linking node 9 and node 2;

communicatively linking node 9 and node 4;

communicatively linking node 9 and node 7; and communicatively linking node 9 and node 8.

19. The method of claim 16 wherein removing at least one of the nodes includes:

removing node 8 from the network.

20. The method of claim 19 wherein removing node 8 includes:

removing the communication link between node 8 and node 0;

removing the communication link between node 8 and node 3;

removing the communication link between node 8 and node 5;

removing the communication link between node 8 and node 6;

communicatively linking node 5 and node 0; and communicatively linking node 6 and node 3.

21. The method of claim 1, wherein the network comprises at least ten nodes that are not fully connected, the nodes including a node 0, a node 1, a node 2, a node 3, a node 4, a node 5, a node 6, a node 7, a node 8, and a node 9, the nodes being communicatively linked as follows:

node 0 is communicatively linked to node 1, node 3, node 4, node 6, and node 8;

node 1 is communicatively linked to node 0, node 2, node 5, node 7, and node 9;

node 2 is communicatively linked to node 1, node 3, node 4, node 6, and node 9;

node 3 is communicatively linked to node 0, node 2, node 5, node 7, and node 8;

node 4 is communicatively linked to node 0, node 2, node 5, node 6, and node 9;

node 5 is communicatively linked to node 1, node 3, node 4, node 7, and node 8;

node 6 is communicatively linked to node 0, node 2, node 4, node 7, and node 8;

node 7 is communicatively linked to node 1, node 3, node 5, node 6, and node 9;

node 8 is communicatively linked to node 0, node 3, node 5, node 6, and node 9; and node 9 is communicatively linked to node 1, node 2, node 4, node 7, and node 8.

22. The method of claim 21 wherein adding a new node includes:

adding a node 10 to the network.

23. The method of claim 22 wherein adding node 10 includes:

removing the communication link between node 2 and node 1;

removing the communication link between node 6 and node 4;

removing the communication link between node 7 and node 5;

communicatively linking node 10 and node 1;

communicatively linking node 10 and node 2;

communicatively linking node 7 and node 4;

communicatively linking node 10 and node 5; and communicatively linking node 10 and node 6.

24. The method of claim 21 wherein removing at least one of the nodes includes:

removing node 9 from the network.

25. The method of claim 24 wherein removing node 9 includes:

removing the communication link between node 9 and node 1;

removing the communication link between node 9 and node 2;

removing the communication link between node 9 and node 4;

removing the communication link between node 9 and node 7;

removing the communication link between node 9 and node 8;

communicatively linking node 4 and node 1; and communicatively linking node 7 and node 2.

26. The method of claim 21 wherein adding a new node includes:

adding a node 10 and a node 11 to the network.

27. The method of claim 26 wherein adding node 10 and node 11 includes the steps of:

removing the communication link between node 2 and node 1;
removing the communication link between node 6 and node 4;
removing the communication link between node 7 and node 5;
removing the communication link between node 3 and node 0;
communicatively linking node 10 and node 1;
communicatively linking node 10 and node 2;
communicatively linking node 10 and node 5;
communicatively linking node 11 and node 6;
communicatively linking node 11 and node 0;
communicatively linking node 11 and node 3;
communicatively linking node 11 and node 4;
communicatively linking node 11 and node 7; and
communicatively linking node 11 and node 10.

28. The method of claim 21 wherein removing at least one of the nodes includes:

removing node 8 and node 9 from the network.

29. The method of claim 28 wherein removing node 8 and node 9 includes the steps of:

removing the communication link between node 8 and node 0;
removing the communication link between node 8 and node 3;
removing the communication link between node 8 and node 5;
removing the communication link between node 8 and node 6;
removing the communication link between node 9 and node 1;
removing the communication link between node 9 and node 2;
removing the communication link between node 9 and node 4;
removing the communication link between node 9 and node 7;
removing the communication link between node 9 and node 8;
communicatively linking node 5 and node 0;
communicatively linking node 6 and node 3;
communicatively linking node 4 and node 1; and
communicatively linking node 7 and node 2.

30. The method of claim 1, wherein the network comprises at least eleven nodes that are not fully connected, the nodes including a node 0, a node 1, a node 2, a node 3, a node 4, a node 5, a node 6, a node 7, a node 8, a node 9, and a node 10, the nodes being communicatively linked as follows:

node 0 is communicatively linked to node 1, node 3, node 4, node 6, and node 8;
node 1 is communicatively linked to node 0, node 5, node 7, node 9, and node 10;
node 2 is communicatively linked to node 3, node 4, node 6, node 9, and node 10;
node 3 is communicatively linked to node 0, node 2, node 5, node 7, and node 8;
node 4 is communicatively linked to node 0, node 2, node 5, node 7, and node 9;
node 5 is communicatively linked to node 1, node 3, node 4, node 8, and node 10;
node 6 is communicatively linked to node 0, node 2, node 7, node 8, and node 10; node 7 is communicatively linked to node 1, node 3, node 4, node 6, and node 9;
node 8 is communicatively linked to node 0, node 3, node 5, node 6, and node 9;
node 9 is communicatively linked to node 1, node 2, node 4, node 7, and node 8; and
node 10 is communicatively linked to node 1, node 2, node 5, and node 6.

31. The method of claim 30 wherein adding a new node includes:

adding a node 11 to the network.

32. The method of claim 31 wherein adding a node 11 includes:

removing the communication link between node 3 and node 0;
removing the communication link between node 7 and node 4;
communicatively linking node 11 and node 0;
communicatively linking node 11 and node 3;
communicatively linking node 11 and node 4;
communicatively linking node 11 and node 7; and
communicatively linking node 11 and node 10.

33. The method of claim 30 wherein removing at least one of the nodes includes:

removing node 10 from the network.

34. The method of claim 33 wherein removing node 11 includes:

removing the communication link between node 10 and node 1;
removing the communication link between node 10 and node 2;
removing the communication link between node 7 and node 4;
removing the communication link between node 10 and node 5;
removing the communication link between node 10 and node 6;
communicatively linking node 2 and node 1;
communicatively linking node 6 and node 4; and
communicatively linking node 7 and node 5.

35. The method of claim 1, wherein the network comprises at least twelve nodes that are not fully connected, the nodes including a node 0, a node 1, a node 2, a node 3, a node 4, a node 5, a node 6, a node 7, a node 8, a node 9, a node 10, and a node 11, the nodes being communicatively linked as follows:

node 0 is communicatively linked to node 1, node 4, node 6, node 8, and node 11;
node 1 is communicatively linked to node 0, node 5, node 7, node 9, and node 10;
node 2 is communicatively linked to node 3, node 4, node 6, node 9, and node 10;
node 3 is communicatively linked to node 2, node 5, node 7, node 8, and node 11;
node 4 is communicatively linked to node 0, node 2, node 5, node 9, and node 11;

node 5 is communicatively linked to node 1, node 3, node 4, node 8, and node 10;

node 6 is communicatively linked to node 0, node 2, node 7, node 8, and node 10;

node 7 is communicatively linked to node 1, node 3, node 6, node 9, and node 11;

node 8 is communicatively linked to node 0, node 3, node 5, node 6, and node 9;

node 9 is communicatively linked to node 1, node 2, node 4, node 7, and node 8;

node 10 is communicatively linked to node 1, node 2, node 5, node 6, and node 11; and node 11 is communicatively linked to node 0, node 3, node 4, node 7, and node 10.

36. The method of claim 35 wherein adding a new node includes:

adding a node 12 to the network.

37. The method of claim 36 wherein adding a node 12 includes:

removing the communication link between node 11 and node 4;

removing the communication link between node 10 and node 5;

removing the communication link between node 8 and node 6;

removing the communication link between node 9 and node 7;

communicatively linking node 12 and node 4;

communicatively linking node 9 and node 5;

communicatively linking node 11 and node 6;

communicatively linking node 12 and node 7;

communicatively linking node 12 and node 8; and communicatively linking node 12 and node 10.

38. The method of claim 35 wherein removing at least one of the nodes includes:

removing node 11 from the network.

39. The method of claim 38 wherein removing node 11 includes:

removing the communication link between node 11 and node 0;

removing the communication link between node 11 and node 3;

removing the communication link between node 11 and node 4;

removing the communication link between node 11 and node 7;

removing the communication link between node 11 and node 10;

communicatively linking node 3 and node 0; and communicatively linking node 7 and node 4.

40. The method of claim 35 wherein adding a new node includes:

adding a node 12 and a node 13 to the network.

41. The method of claim 40 wherein adding a node 12 includes the steps of:

removing the communication link between node 11 and node 4;

removing the communication link between node 10 and node 5;

removing the communication link between node 8 and node 6;

removing the communication link between node 9 and node 7;

communicatively linking node 12 and node 4;

communicatively linking node 12 and node 7;

communicatively linking node 12 and node 8;

communicatively linking node 12 and node 10;

communicatively linking node 13 and node 5;

communicatively linking node 13 and node 6;

communicatively linking node 13 and node 9;

communicatively linking node 13 and node 11; and communicatively linking node 13 and node 12.

42. The method of claim 35 wherein removing at least one of the nodes includes:

removing node 10 and node 11 from the network.

43. The method of claim 42 wherein removing node 10 and node 11 includes the steps of:

removing the communication link between node 10 and node 1;

removing the communication link between node 10 and node 2;

removing the communication link between node 10 and node 5;

removing the communication link between node 10 and node 6;

removing the communication link between node 11 and node 0;

removing the communication link between node 11 and node 3;

removing the communication link between node 11 and node 4;

removing the communication link between node 11 and node 7;

removing the communication link between node 11 and node 10;

communicatively linking node 2 and node 1;

communicatively linking node 6 and node 4;

communicatively linking node 7 and node 5; and communicatively linking node 3 and node 0.

44. The method of claim 1, wherein the network comprises at least thirteen nodes that are not fully connected, the nodes including a node 0, a node 1, a node 2, a node 3, a node 4, a node 5, a node 6, a node 7, a node 8, a node 9, a node 10, a node 11, and a node 12, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 12;

node 5 is communicatively linked to node 1, node 3, node 4, node 6, and node 8;

node 6 is communicatively linked to node 0, node 2, node 5, node 7, and node 10;

node 7 is communicatively linked to node 1, node 3, node 6, node 11, and node 12;

node 8 is communicatively linked to node 0, node 3, node 5, node 9, and node 12;

node 9 is communicatively linked to node 1, node 2, node 4, node 8, and node 11;

node 10 is communicatively linked to node 1, node 2, node 6, node 11, and node 12;

node 11 is communicatively linked to node 0, node 3, node 7, node 9, and node 10; and node 12 is communicatively linked to node 4, node 7, node 8, and node 10.

45. The method of claim 44 wherein adding a new node includes:

adding a node 13 to the network.

46. The method of claim 45 wherein adding a node 13 includes:

removing the communication link between node 9 and node 5;

removing the communication link between node 11 and node 6;

communicatively linking node 13 and node 5;

communicatively linking node 13 and node 6;

communicatively linking node 13 and node 9;

communicatively linking node 13 and node 11; and communicatively linking node 13 and node 12.

47. The method of claim 44 wherein removing at least one of the nodes includes:

removing node 12 from the network.

48. The method of claim 45 wherein removing node 12 includes:

removing the communication link between node 12 and node 4;

removing the communication link between node 9 and node 5;

removing the communication link between node 11 and node 6;

removing the communication link between node 12 and node 7;

removing the communication link between node 12 and node 8;

removing the communication link between node 12 and node 10;

communicatively linking node 11 and node 4;

communicatively linking node 10 and node 5;

communicatively linking node 8 and node 6; and communicatively linking node 9 and node 7.

49. The method of claim 1, wherein the network comprises at least fourteen nodes that are not fully connected, the nodes including a node 0, a node 1, a node 2, a node 3, a node 4, a node 5, a node 6, a node 7, a node 8, a node 9, a node 10, a node 11, a node 12, and a node 13, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 12;

node 5 is communicatively linked to node 1, node 3, node 4, node 8, and node 13;

node 6 is communicatively linked to node 0, node 2, node 7, node 10, and node 13;

node 7 is communicatively linked to node 1, node 3, node 6, node 11, and node 12;

node 8 is communicatively linked to node 0, node 3, node 5, node 9, and node 12;

node 9 is communicatively linked to node 1, node 2, node 4, node 8, and node 13;

node 10 is communicatively linked to node 1, node 2, node 6, node 11, and node 12;

node 11 is communicatively linked to node 0, node 3, node 7, node 10, and node 13;

node 12 is communicatively linked to node 4, node 7, node 8, node 10, and node 13; and node 13 is communicatively linked to node 5, node 6, node 9, node 11, and node 12.

50. The method of claim 49 wherein adding a new node includes:

adding a node 14 to the network.

51. The method of claim 50 wherein adding a node 14 includes:

removing the communication link between node 8 and node 5;

removing the communication link between node 10 and node 6;

communicatively linking node 14 and node 5;

communicatively linking node 14 and node 6;

communicatively linking node 14 and node 8; and communicatively linking node 14 and node 10.

52. The method of claim 49 wherein removing at least one of the nodes includes:

removing node 13 from the network.

53. The method of claim 52 wherein removing node 13 includes:

removing the communication link between node 13 and node 5;

removing the communication link between node 13 and node 6;

removing the communication link between node 13 and node 9;

removing the communication link between node 13 and node 11;

removing the communication link between node 13 and node 12;

communicatively linking node 9 and node 5; and communicatively linking node 11 and node 6.

54. The method of claim 48 wherein adding a new node includes:

adding a node 14 and a node 15 to the network.

55. The method of claim 52 wherein adding a node 14 and a node 15 includes the steps of:

removing the communication link between node 8 and node 5;

removing the communication link between node 10 and node 6;

removing the communication link between node 9 and node 4;

removing the communication link between node 11 and node 7;

communicatively linking node 14 and node 5;

communicatively linking node 14 and node 6;

communicatively linking node 14 and node 8;

communicatively linking node 14 and node 10;

communicatively linking node 15 and node 4;

communicatively linking node 15 and node 7;

communicatively linking node 15 and node 9;

communicatively linking node 15 and node 11; and communicatively linking node 15 and node 14.

56. The method of claim 49 wherein removing at least one of the nodes includes:

removing node 12 and node 13 from the network.

57. The method of claim 56 wherein removing node 12 and node 13 includes the steps of:

removing the communication link between node 12 and node 4;

removing the communication link between node 12 and node 7;

removing the communication link between node 12 and node 8;

removing the communication link between node 12 and node 10;

removing the communication link between node 13 and node 5;

removing the communication link between node 13 and node 6;

removing the communication link between node 13 and node 9;

removing the communication link between node 13 and node 11;

removing the communication link between node 13 and node 12;

communicatively linking node 11 and node 4;

communicatively linking node 10 and node 5;

communicatively linking node 8 and node 6; and communicatively linking node 9 and node 7.

58. The method of claim 1, wherein the network comprises at least fifteen nodes that are not fully connected, the nodes including a node 0, a node 1, a node 2, a node 3, a node 4, a node 5, a node 6, a node 7, a node 8, a node 9, a node 10, a node 11, a node 12, a node 13, and a node 14, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 9, and node 12;

node 5 is communicatively linked to node 1, node 3, node 4, node 13, and node 14;

node 6 is communicatively linked to node 0, node 2, node 7, node 13, and node 14;

node 7 is communicatively linked to node 1, node 3, node 6, node 11, and node 12;

node 8 is communicatively linked to node 0, node 3, node 9, node 12, and node 14;

node 9 is communicatively linked to node 1, node 2, node 4, node 8, and node 13;

node 10 is communicatively linked to node 1, node 2, node 11, node 12, and node 14;

node 11 is communicatively linked to node 0, node 3, node 7, node 10, and node 13;

node 12 is communicatively linked to node 4, node 7, node 8, node 10, and node 13;

node 13 is communicatively linked to node 5, node 6, node 9, node 11, and node 12; and node 14 is communicatively linked to node 5, node 6, node 8, and node 10.

59. The method of claim 58 wherein adding a new node includes:

adding a node 15 to the network.

60. The method of claim 59 wherein adding a node 15 includes:

removing the communication link between node 9 and node 4;

removing the communication link between node 11 and node 7;

communicatively linking node 15 and node 4;

communicatively linking node 15 and node 7;

communicatively linking node 15 and node 9;

communicatively linking node 15 and node 11; and communicatively linking node 15 and node 14.

61. The method of claim 58 wherein removing at least one of the nodes includes:

removing node 14 from the network.

62. The method of claim 61 wherein removing node 14 includes:

removing the communication link between node 14 and node 5;

removing the communication link between node 14 and node 6;

removing the communication link between node 14 and node 8;

removing the communication link between node 14 and node 10;

communicatively linking node 8 and node 5; and communicatively linking node 10 and node 6.

63. The method of claim 1, wherein the network comprises at least six nodes, the nodes including a node 0, a node 1, a node 2, a node 3, a node 4, and a node 5, wherein each of the nodes is communicatively linked to each other; and wherein adding a new node includes adding a node 6 to the network by performing the following steps:

removing the communication link between node 2 and node 0;

removing the communication link between node 4 and node 3;

communicatively linking node 6 to node 0;

communicatively linking node 6 to node 2;

communicatively linking node 6 to node 3; and communicatively linking node 6 to node 4.

64. The method of claim 1, wherein the network comprises at least six nodes, the nodes including a node 0, a node 1, a node 2, a node 3, a node 4, and a node 5, wherein each of the six nodes is communicatively linked to each other; and wherein adding a new node includes adding a node 6 and a node 7 to the network by performing the following steps:

removing the communication link between node 2 and node 0;

removing the communication link between node 4 and node 3;

removing the communication link between node 3 and node 1;

removing the communication link between node 5 and node 2;

communicatively linking node 6 to node 0;
communicatively linking node 6 to node 2;
communicatively linking node 6 to node 3;
communicatively linking node 6 to node 4;
communicatively linking node 7 to node 1;
communicatively linking node 7 to node 2;
communicatively linking node 7 to node 3;
communicatively linking node 7 to node 5; and
communicatively linking node 7 to node 6.

65. The method of claim 1 wherein the static routing is performed deadlock free.

66. The method of claim 1 wherein the reconfiguring step includes adding two new nodes to the network.

67. The method of claim 1 wherein the reconfiguring step includes removing two of the nodes from the network.

68. The method of claim 1 wherein each of the nodes has a routing table for routing traffic through the network, and wherein the reconfiguring step includes:

replacing the routing tables with interim routing tables which route the traffic around a part of the network affected by the reconfiguration;

performing the reconfiguration; and substituting new routing tables for the interim routing tables.

69. The method of claim 68, wherein the interim routing tables are deadlock free.

70. The method of claim 1, wherein the network has a node 0, a node 1, a node 2, a node 3, a node 4, a node 5, and wherein the reconfiguring step includes:

utilizing the following routings for routing network traffic during the reconfiguration:

| FROM\TO | 0 | 1 | 2 | 3 | 4 | 5 |
|---|---|---|---|---|---|---|
| 0 | | — | 3 | — | — | — |
| 1 | — | | — | — | — | — |
| 2 | 1 | — | | — | — | — |
| 3 | — | — | — | | 5 | — |
| 4 | — | — | — | 2 | | — |
| 5 | — | — | — | — | — | . |

71. The method of claim 1, wherein the network has a node 0, a node 1, a node 2, a node 3, a node 4, a node 5, and a node 6, and wherein the reconfiguring step includes:

utilizing the following routings for routing network traffic during the reconfiguration:

| FROM\TO | 0 | 1 | 2 | 3 | 4 | 5 | 6 |
|---|---|---|---|---|---|---|---|
| 0 | | — | 3 | — | — | — | — |
| 1 | — | | — | 2 | — | — | 4 |
| 2 | 1 | — | | — | — | 4 | — |
| 3 | — | 0 | — | | 5 | — | — |
| 4 | — | — | — | 2 | | — | — |
| 5 | — | — | 3 | — | — | | 3 |
| 6 | — | 0 | — | — | — | 4 | . |

72. The method of claim 1, wherein the network has a node 0, a node 1, a node 2, a node 3, a node 4, a node 5, a node 6, and a node 7, and wherein the reconfiguring step includes:

utilizing the following routings for routing network traffic during the reconfiguration:

| FROM\TO | 0 | 1 | 2 | 3 | 4 | 5 | 6 | 7 |
|---|---|---|---|---|---|---|---|---|
| 0 | | — | 3 | — | — | 4 | — | 6 |
| 1 | — | | — | 2 | — | — | 7 | — |
| 2 | 1 | — | | — | 4 | — | — | — |
| 3 | — | 0 | — | | — | 5 | — | 7 |
| 4 | — | — | — | 2 | | — | — | 6 |
| 5 | 1 | — | 3 | — | — | | 7 | — |
| 6 | — | 0 | — | 2 | — | 4 | | — |
| 7 | 1 | — | — | — | — | 5 | — | . |

73. The method of claim 1, wherein the network has a node 0, a node 1, a node 2, a node 3, a node 4, a node 5, a node 6, a node 7, and a node 8, and wherein the reconfiguring step includes:

utilizing the following routings for routing network traffic during the reconfiguration:

| FROM\TO | 0 | 1 | 2 | 3 | 4 | 5 | 6 | 7 | 8 |
|---|---|---|---|---|---|---|---|---|---|
| 0 | | — | 3 | — | — | 4 | — | 6 | — |
| 1 | — | | — | 2 | 5 | — | 7 | — | 5 |
| 2 | 1 | — | | — | — | 4 | — | 6 | 6 |
| 3 | — | 0 | — | | 5 | — | 7 | — | — |
| 4 | — | 0 | — | 2 | | — | — | 6 | 0 |
| 5 | 1 | — | 3 | — | — | | 7 | — | — |
| 6 | — | 0 | — | 2 | — | 4 | | — | — |
| 7 | 1 | — | 3 | — | 5 | — | — | | 3 |
| 8 | — | 0 | 3 | — | 5 | — | — | 6 | . |

74. The method of claim 1, wherein the network has a node 0, a node 1, a node 2, a node 3, a node 4, a node 5, a node 6, a node 7, a node 8, and a node 9, and wherein the reconfiguring step includes:

utilizing the following routings for routing network traffic during the reconfiguration:

| FROM\TO | 0 | 1 | 2 | 3 | 4 | 5 | 6 | 7 | 8 | 9 |
|---|---|---|---|---|---|---|---|---|---|---|
| 0 | | — | 3 | — | — | 4 | — | 6 | — | 8 |
| 1 | — | | 9 | 5 | 5 | — | 7 | — | 9 | — |
| 2 | 6 | 9 | | — | — | 4 | — | 6 | 9 | — |
| 3 | — | 0 | — | | 5 | — | 7 | — | — | 8 |
| 4 | — | 0 | — | 2 | | — | 0 | 9 | 9 | — |
| 5 | 1 | — | 3 | — | — | | 8 | 1 | — | 8 |
| 6 | — | 0 | — | 2 | 2 | 8 | | — | — | 8 |
| 7 | 1 | — | 3 | — | 9 | 3 | — | | 9 | — |
| 8 | — | 0 | 3 | — | 5 | — | — | 6 | | — |
| 9 | 1 | — | — | 2 | — | 4 | 7 | — | — | . |

75. The method of claim 1, wherein the network has a node 0, a node 1, a node 2, a node 3, a node 4, a node 5, a node 6, a node 7, a node 8, a node 9, and a node 10, and wherein the reconfiguring step includes:

utilizing the following routings for routing network traffic during the reconfiguration:

| FROM\TO | 0 | 1 | 2 | 3 | 4 | 5 | 6 | 7 | 8 | 9 | 10 |
|---|---|---|---|---|---|---|---|---|---|---|---|
| 0 |  | — | 4 | 8 | — | 4 | — | 6 | — | 8 | 6 |
| 1 | — |  | 9 | 5 | 5 | — | 7 | — | 9 | — | — |
| 2 | 6 | 10 |  | — | — | 4 | — | 6 | 9 | — | — |
| 3 | 8 | 7 | — |  | 5 | — | 7 | — | — | 8 | 5 |
| 4 | — | 0 | — | 2 |  | — | 0 | 9 | 9 | — | 2 |
| 5 | 1 | — | 3 | — | — |  | 8 | 1 | — | 8 | — |
| 6 | — | 0 | — | 2 | 2 | 8 |  | — | — | 8 | — |
| 7 | 1 | — | 3 | — | 9 | 3 | — |  | 9 | — | 1 |
| 8 | — | 0 | 3 | — | 5 | — | — | 6 |  | — | 6 |
| 9 | 1 | — | — | 2 | — | 4 | 7 | — | — |  | 1 |
| 10 | 1 | — | — | 2 | 5 | — | — | 6 | 6 | 2. |  |

76. The method of claim 1, wherein the network has a node 0, a node 1, a node 2, a node 3, a node 4, a node 5, a node 6, a node 7, a node 8, a node 9, a node 10, and a node 11, and wherein the reconfiguring step includes:

utilizing the following routings for routing network traffic during the reconfiguration:

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 |  | — | 4 | 8 | — | 4 | — | 6 | — | 8 | 11 | — |
| 1 | — |  | 9 | 5 | 5 | — | 7 | — | 9 | — | — | 10 |
| 2 | 4 | 10 |  | — | — | 4 | — | 6 | 9 | — | — | 10 |
| 3 | 8 | 7 | — |  | 5 | — | 7 | — | — | 8 | 11 | — |
| 4 | — | 0 | — | 2 |  | — | 0 | 0.6 | 9 | — | 2 | 0 |
| 5 | 1 | — | 3 | — | — |  | 1.7 | 1 | — | 8 | 1 | 3 |
| 6 | — | 0 | — | 2 | 2 | 2.4 |  | — | 0 | 2 | — | 10 |
| 7 | 1 | — | 3 | — | 3.5 | 3 | — |  | 3 | 1 | 11 | — |
| 8 | — | 0 | 3 | — | 5 | — | 0 | 3 |  | — | 0.11 | 0 |
| 9 | 1 | — | — | 2 | — | 4 | 2 | 1 | — |  | 1 | 1.10 |
| 10 | 1 | — | — | 2 | 2 | 1 | — | 6 | 2.9 | 2 |  | — |
| 11 | — | 0 | 3 | — | 0 | 3 | 7 | — | 3 | 3.8 | — |  . |

77. The method of claim 1, wherein the network has a node 0, a node 1, a node 2, a node 3, a node 4, a node 5, a node 6, a node 7, a node 8, a node 9, a node 10, a node 11 and a node 12, and wherein the reconfiguring step includes:

utilizing the following routings for routing network traffic during the reconfiguration:

| FROM\TO | 0 | 1 | 2 | 3 | 4 | 5 | 6 | 7 | 8 | 9 | 10 | 11 | 12 |
|---|---|---|---|---|---|---|---|---|---|---|---|---|---|
| 0 |  | — | 4 | 8 | — | 4 | — | 6 | — | 8 | 11 | — | 4 |
| 1 | — |  | 9 | 5 | 5 | — | 7 | — | 9 | — | — | 10 | 7 |
| 2 | 6 | 10 |  | — | — | 4 | — | 6 | 9 | — | — | 10 | 10 |
| 3 | 8 | 7 | — |  | 5 | — | 7 | — | — | 8 | 11 | — | 7 |
| 4 | — | 0 | — | 2 |  | — | 0 | 12 | 9 | — | 12 | 0 | — |
| 5 | 1 | — | 3 | — | — |  | 1.7 | 1 | — | 8 | 1 | 3 | 8 |
| 6 | — | 0 | — | 2 | 2 | 2.4 |  | — | 0 | 2 | — | 10 | 10 |
| 7 | 1 | — | 3 | — | 12 | 3 | — |  | 3 | 1 | 11 | — | — |
| 8 | — | 0 | 3 | — | 5 | — | 0 | 12 |  | — | 12 | 0 | — |
| 9 | 1 | — | — | 2 | — | 4 | 2 | 1 | — |  | 1 | 1.10 | 4 |
| 10 | 1 | — | — | 2 | 2 | 1 | — | 6 | 12 | 2 |  | — | — |
| 11 | — | 0 | 3 | — | 0 | 3 | 7 | — | 3 | 3.8 | — |  | 7 |
| 12 | 8 | 10 | 4 | 8 | — | 4 | 7 | — | — | 8 | — | 10. |  |

78. The method of claim 1, wherein the network has a node 0, a node 1, a node 2, a node 3, a node 4, a node 5, a node 6, a node 7, a node 8, a node 9, a node 10, a node 11, a node 12, and a node 13, and wherein the reconfiguring step includes:

utilizing the following routings for routing network traffic during the reconfiguration:

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 |  | — | 4 | 8 | — | 4 | — | 6 | — | 8 | 11 | — | 4 | 6 |
| 1 | — |  | 9 | 5 | 5 | — | 7 | — | 9 | — | — | 10 | 7 | 9 |
| 2 | 6 | 10 |  | — | — | 4 | — | 6 | 9 | — | — | 10 | 10 | 6 |
| 3 | 11 | 7 | — |  | 5 | — | 7 | — | — | 8 | 11 | — | 7 | 11 |
| 4 | — | 0 | — | 2 |  | — | 0 | 12 | 9 | — | 12 | 0 | — | 12 |
| 5 | 1 | — | 3 | — | — |  | 13 | 1 | 3 | 1 | 1 | 13 | 13 | — |
| 6 | — | 0 | — | 2 | 2 | 13 |  | — | 0 | 2 | 2 | 0 | 13 | — |
| 7 | 1 | — | 3 | — | 12 | 3 | — |  | 3 | 1 | 11 | — | — | 12 |
| 8 | — | 0 | 3 | — | 12 | 3 | 0 | 12 |  | — | 12 | 0 | — | 12 |
| 9 | 1 | — | — | 2 | — | 4 | 13 | 1 | — |  | 1 | 13 | 13 | — |
| 10 | 1 | — | — | 2 | 2 | 1 | 2 | 12 | 12 | 2 |  | — | — | 12 |
| 11 | — | 0 | 3 | — | 0 | 3 | 7 | — | 3 | 13 | — |  | 13 | — |
| 12 | 8 | 10 | 4 | 8 | — | 4 | 7 | — | — | 8 | — | 10 |  | — |
| 13 | 11 | 9 | 9 | 5 | 5 | — | — | 6 | 9 | — | 11 | — | — |  . |

79. The method of claim 1, wherein the network has a node 0, a node 1, a node 2, a node 3, a node 4, a node 5, a node 6, a node 7, a node 8, a node 9, a node 10, a node 11, a node 12, a node 13, and a node 14, wherein the reconfiguring step includes:

utilizing the following routings for routing network traffic during the reconfiguration:

| FROM\TO | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | — | 4 | 8 | — | 4 | — | 6 | — | 8 | 11 | — | 4 | 6 | 8 |
| 1 | — | | 9 | 5 | 5 | — | 7 | — | 9 | — | — | 10 | 7 | 5 | 5 |
| 2 | 6 | 10 | | — | — | 4 | — | 6 | 9 | — | — | 10 | 10 | 6 | 6 |
| 3 | 11 | 7 | — | | 5 | — | 7 | — | — | 8 | 11 | — | 7 | 11 | 5 |
| 4 | — | 0 | — | 2 | | — | 0 | 12 | 0 | 2 | 12 | 0 | — | 12 | 5 |
| 5 | 1 | — | 3 | — | — | | 13 | 1 | 3 | 1 | 1 | 13 | 13 | — | — |
| 6 | — | 0 | — | 2 | 2 | 14 | | — | 14 | 2 | 2 | 0 | 13 | — | — |
| 7 | 1 | — | 3 | — | 12 | 3 | — | | 3 | 1 | 1 | 3 | — | 12 | 6 |
| 8 | — | 0 | 3 | — | 12 | 14 | 0 | 12 | | — | 12 | 0 | — | 12 | — |
| 9 | 1 | — | — | 2 | 2 | 13 | 13 | 1 | — | | 1 | 13 | 13 | — | 8 |
| 10 | 1 | — | — | 2 | 2 | 14 | 2 | 12 | 14 | 2 | | — | — | 12 | — |
| 11 | — | 0 | 3 | — | 0 | 3 | 13 | 3 | 3 | 13 | — | | 13 | — | 10 |
| 12 | 8 | 10 | 4 | 8 | — | 4 | 7 | — | — | 8 | — | 10 | | — | 8 |
| 13 | 11 | 9 | 9 | 5 | 5 | — | — | 6 | 9 | — | 11 | — | — | | 5 |
| 14 | 6 | 10 | 10 | 8 | 5 | — | — | 6 | — | 8 | — | 10 | 10 | 6. | |

80. The method of claim 1, wherein the network has a node 0, a node 1, a node 2, a node 3, a node 4, and a node 5, and wherein the reconfiguring step includes:

utilizing the following routings for routing network traffic during the reconfiguration:

| FROM\TO | 0 | 1 | 2 | 3 | 4 | 5 |
|---|---|---|---|---|---|---|
| 0 | | — | 3 | — | — | — |
| 1 | — | | — | 2 | — | — |
| 2 | 1 | — | | — | — | 4 |
| 3 | — | 0 | — | | 5 | — |
| 4 | — | — | — | 2 | | — |
| 5 | — | — | 3 | — | —. | |

81. The method of claim 1, wherein the network has a node 0, a node 1, a node 2, a node 3, a node 4, a node 5, a node 6, and a node 7, and wherein the reconfiguring step includes:

utilizing the following routings for routing network traffic during the reconfiguration:

| FROM\TO | 0 | 1 | 2 | 3 | 4 | 5 | 6 | 7 |
|---|---|---|---|---|---|---|---|---|
| 0 | | — | 3 | — | — | 4 | — | 6 |
| 1 | — | | — | 2 | 5 | — | 7 | — |
| 2 | 1 | — | | — | — | 4 | — | 6 |
| 3 | — | 0 | — | | 5 | — | 7 | — |
| 4 | — | 0 | — | 2 | | — | — | 6 |
| 5 | 1 | — | 3 | — | — | | 7 | — |
| 6 | — | 0 | — | 2 | — | 4 | | — |
| 7 | 1 | — | 3 | — | 5 | — | —. | |

82. The method of claim 1, wherein the network has a node 0, a node 1, a node 2, a node 3, a node 4, a node 5, a node 6, a node 7, a node 8, and a node 9, and wherein the reconfiguring step includes:

utilizing the following routings for routing network traffic during the reconfiguration:

| FROM\TO | 0 | 1 | 2 | 3 | 4 | 5 | 6 | 7 | 8 | 9 |
|---|---|---|---|---|---|---|---|---|---|---|
| 0 | | — | 4 | 8 | — | 4 | — | 6 | — | 8 |
| 1 | — | | 9 | 5 | 5 | — | 7 | — | 9 | — |

-continued

| FROM\TO | 0 | 1 | 2 | 3 | 4 | 5 | 6 | 7 | 8 | 9 |
|---|---|---|---|---|---|---|---|---|---|---|
| 2 | 6 | 9 | | — | — | 4 | — | 6 | 9 | — |
| 3 | 8 | 7 | — | | 5 | — | 7 | — | — | 8 |
| 4 | — | 0 | — | 2 | | — | 0 | 9 | 9 | — |
| 5 | 1 | — | 3 | — | — | | 8 | 1 | — | 8 |
| 6 | — | 0 | — | 2 | 2 | 8 | | — | — | 8 |
| 7 | 1 | — | 3 | — | 9 | 3 | — | | 9 | — |
| 8 | — | 0 | 3 | — | 5 | — | — | 6 | | — |
| 9 | 1 | — | — | 2 | — | 4 | 7 | — | —. | |

83. The method of claim 1, wherein the network has a node 0, a node 1, a node 2, a node 3, a node 4, a node 5, a node 6, a node 7, a node 8, a node 9, a node 10, and a node 11, and wherein the reconfiguring step includes:

utilizing the following routings for routing network traffic during the reconfiguration:

| FROM\TO | 0 | 1 | 2 | 3 | 4 | 5 | 6 | 7 | 8 | 9 | 10 | 11 |
|---|---|---|---|---|---|---|---|---|---|---|---|---|
| 0 | | — | 4 | 8 | — | 4 | — | 6 | — | 8 | 11 | — |
| 1 | — | | 9 | 5 | 5 | — | 7 | — | 9 | — | — | 10 |
| 2 | 4 | 10 | | — | — | 4 | — | 6 | 9 | — | — | 10 |
| 3 | 8 | 7 | — | | 5 | — | 7 | — | — | 8 | 11 | — |
| 4 | — | 0 | — | 2 | | — | 0 | 0.6 | 9 | — | 2 | 0 |
| 5 | 1 | — | 3 | — | — | | 1.7 | 1 | — | 8 | 1 | 3 |
| 6 | — | 0 | — | 2 | 2 | 2.4 | | — | 0 | 2 | — | 10 |
| 7 | 1 | — | 3 | — | 3.5 | 3 | — | | 3 | 1 | 11 | — |
| 8 | — | 0 | 3 | — | 5 | — | 0 | 3 | | — | 0.11 | 0 |
| 9 | 1 | — | — | 2 | — | 4 | 2 | 1 | — | | 1 | 1.10 |
| 10 | 1 | — | — | 2 | 2 | 1 | — | 6 | 2.9 | 2 | | — |
| 11 | — | 0 | 3 | — | 0 | 3 | 7 | — | 3 | 3.8 | —. | |

84. The method of claim 1, wherein the network has a node 0, a node 1, a node 2, a node 3, a node 4, a node 5, a node 6, a node 7, a node 8, a node 9, a node 10, a node 11, a node 12, and a node 13, and wherein the reconfiguring step includes:

utilizing the following routings for routing network traffic during the reconfiguration.

| FROM\TO | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0  | —  | —  | 4  | 8  | —  | 4  | —  | 6  | —  | 8  | 11 | —  | 8  | 6  |
| 1  | —  | —  | 9  | 5  | 5  | —  | 7  | —  | 9  | —  | —  | 10 | 7  | 5  |
| 2  | 6  | 10 | —  | —  | 4  | —  | 6  | 9  | —  | —  | 10 | 10 | 6  | —  |
| 3  | 11 | 7  | —  | —  | 5  | —  | 7  | —  | —  | 8  | 11 | —  | 7  | 11 |
| 4  | —  | 0  | —  | 2  | —  | —  | 0  | 12 | 0  | 2  | 12 | 0  | —  | 12 |
| 5  | 1  | —  | 3  | —  | —  | —  | 13 | 1  | 3  | 1  | 1  | 13 | 13 | —  |
| 6  | —  | 0  | —  | 2  | 2  | 13 | —  | 0  | 2  | 2  | 0  | 13 | —  | —  |
| 7  | 1  | —  | 3  | —  | 12 | 3  | —  | —  | 3  | 1  | 1  | 3  | —  | 12 |
| 8  | —  | 0  | 3  | —  | 12 | 3  | 0  | 12 | —  | —  | 12 | 0  | —  | 12 |
| 9  | 1  | —  | —  | 2  | 2  | 13 | 13 | 1  | —  | —  | 1  | 13 | 13 | —  |
| 10 | 1  | —  | —  | 2  | 2  | 1  | 2  | 12 | 12 | 2  | —  | —  | —  | 12 |
| 11 | —  | 0  | 3  | —  | 0  | 3  | 13 | 3  | 3  | 13 | —  | —  | 13 | —  |
| 12 | 8  | 10 | 4  | 8  | —  | 4  | 7  | —  | —  | 8  | —  | 10 | —  | —  |
| 13 | 11 | 9  | 9  | 5  | 5  | —  | —  | 6  | 9  | —  | 11 | —  | —  | —  |

85. The method of claim 1, wherein the network comprises at least sixteen nodes that are not fully connected, the nodes including a node 0, a node 1, a node 2, a node 3, a node 4, a node 5, a node 6, a node 7, a node 8, a node 9, a node 10, a node 11, a node 12, a node 13, a node 14, and a node 15, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 12, and node 15;

node 5 is communicatively linked to node 1, node 3, node 4, node 13, and node 14;

node 6 is communicatively linked to node 0, node 2, node 7, node 13, and node 14;

node 7 is communicatively linked to node 1, node 3, node 6, node 12, and node 15;

node 8 is communicatively linked to node 0, node 3, node 9, node 12, and node 14;

node 9 is communicatively linked to node 1, node 2, node 8, node 13, and node 15;

node 10 is communicatively linked to node 1, node 2, node 11, node 12, and node 14;

node 11 is communicatively linked to node 0, node 3, node 10, node 13, and node 15;

node 12 is communicatively linked to node 4, node 7, node 8, node 10, and node 13;

node 13 is communicatively linked to node 5, node 6, node 9, node 11, and node 12;

node 14 is communicatively linked to node 5, node 6, node 8, node 10, and node 15; and node 15 is communicatively linked to node 4, node 7, node 9, node 11, and node 14, and wherein reconfiguring the network is replaced by reconfiguring the network while the network remains operation by performing the following steps:

removing the link between node 15 and node 4;
removing the link between node 15 and node 7;
removing the link between node 15 and node 9;
removing the link between node 15 and node 11;
removing the link between node 15 and node 14;
adding a link between node 9 and node 4; and
adding a link between node 11 and node 7.

86. The method of claim 1, wherein the network comprises at least sixteen nodes that are not fully connected, the nodes including a node 0, a node 1, a node 2, a node 3, a node 4, a node 5, a node 6, a node 7, a node 8, a node 9, a node 10, a node 11, a node 12, a node 13, a node 14, and a node 15, the nodes being communicatively linked as follows:

node 0 is communicatively linked to node 1, node 4, node 6, node 8, and node 11;

node 1 is communicatively linked to node 0, node 5, node 7, node 9, and node 10;

node 2 is communicatively linked to node 3, node 4, node 6, node 9, and node 10;

node 3 is communicatively linked to node 2, node 5, node 7, node 8, and node 11;

node 4 is communicatively linked to node 0, node 2, node 5, node 12, and node 15;

node 5 is communicatively linked to node 1, node 3, node 4, node 13, and node 14;

node 6 is communicatively linked to node 0, node 2, node 7, node 13, and node 14;

node 7 is communicatively linked to node 1, node 3, node 6, node 12, and node 15;

node 8 is communicatively linked to node 0, node 3, node 9, node 12, and node 14;

node 9 is communicatively linked to node 1, node 2, node 8, node 13, and node 15;

node 10 is communicatively linked to node 1, node 2, node 11, node 12, and node 14;

node 11 is communicatively linked to node 0, node 3, node 10, node 13, and node 15;

node 12 is communicatively linked to node 4, node 7, node 8, node 10, and node 13;

node 13 is communicatively linked to node 5, node 6, node 9, node 11, and node 12;

node 14 is communicatively linked to node 5, node 6, node 8, node 10, and node 15; and node 15 is communicatively linked to node 4, node 7, node 9, node 11, and node 14, and wherein reconfiguring the network is replaced by reconfiguring the network while the network remains operational by performing the following steps:

removing the link between node 14 and node 5;
removing the link between node 14 and node 6;
removing the link between node 14 and node 8;
removing the link between node 14 and node 10;
removing the link between node 15 and node 4;
removing the link between node 15 and node 7;
removing the link between node 15 and node 9;
removing the link between node 15 and node 11;
removing the link between node 15 and node 14;
adding a link between node 8 and node 5;
adding a link between node 10 and node 6;
adding a link between node 9 and node 4 and
adding a link between node 11 and node 7.

* * * * *

UNITED STATES PATENT AND TRADEMARK OFFICE
CERTIFICATE OF CORRECTION

PATENT NO.    : 6,603,742 B1
DATED         : August 5, 2003
INVENTOR(S)   : Guy L. Steele Jr. et al.

It is certified that error appears in the above-identified patent and that said Letters Patent is hereby corrected as shown below:

<u>Title page,</u>
Item [75], Inventors, "Chelmsford," should reaed -- Acton --;

<u>Column 18,</u>
Line 59, "anode" should read -- a node --;

<u>Column 19,</u>
Line 51, "node 7" should read -- node 7; --;

<u>Column 23,</u>
Line 18, "node 11 and node 6;" should read -- node 10 and node 6; --;

<u>Column 24,</u>
Line 7, after "node 10;", insert a line break;

<u>Column 27,</u>
Line 25, "claim 45" should read -- claim 47 --;

<u>Column 28,</u>
Line 47, "claim 48" should read -- claim 49 --;
Line 50, "claim 52" should read -- claim 54 --;

<u>Column 33,</u>
Lines 30-36, in the routing "0.6.", "1.7", "2.4", "3.5", "0.11", "1.10, "2.9, and ":3.8", should read -- "0.6", "1.7", "2.4", "3.5", "0.111", "1.10", "2.9", and "3.8 --, respectively;

Signed and Sealed this

Twenty-seventh Day of January, 2004

JON W. DUDAS
*Acting Director of the United States Patent and Trademark Office*